US011985720B2

(12) United States Patent
Patil et al.

(10) Patent No.: US 11,985,720 B2
(45) Date of Patent: May 14, 2024

(54) SYNCHRONIZING MULTI-LINK COMMUNICATIONS IN A WIRELESS LOCAL AREA NETWORK (WLAN)

(71) Applicant: QUALCOMM Incorporated, San Diego, CA (US)

(72) Inventors: Abhishek Pramod Patil, San Diego, CA (US); Sai Yiu Duncan Ho, San Diego, CA (US); George Cherian, San Diego, CA (US); Alfred Asterjadhi, San Diego, CA (US); Lochan Verma, Danville, CA (US)

(73) Assignee: QUALCOMM Incorporated, San Diego, CA (US)

( * ) Notice: Subject to any disclaimer, the term of this patent is extended or adjusted under 35 U.S.C. 154(b) by 112 days.

(21) Appl. No.: 17/100,353

(22) Filed: Nov. 20, 2020

(65) Prior Publication Data
US 2021/0160941 A1 May 27, 2021

Related U.S. Application Data

(60) Provisional application No. 62/939,203, filed on Nov. 22, 2019.

(51) Int. Cl.
*H04W 76/15* (2018.01)
*H04L 1/1607* (2023.01)
(Continued)

(52) U.S. Cl.
CPC ........... *H04W 76/15* (2018.02); *H04L 1/1642* (2013.01); *H04L 5/0055* (2013.01); *H04W 80/02* (2013.01); *H04W 84/12* (2013.01)

(58) Field of Classification Search
CPC ..... H04W 76/15; H04W 80/02; H04W 84/12; H04W 4/80; H04W 74/0808;
(Continued)

(56) References Cited

U.S. PATENT DOCUMENTS

| 11,082,887 B2 | 8/2021 | Bang et al. | |
| 2013/0163460 A1* | 6/2013 | Gonikberg | ........ H04W 72/1215 370/252 |

(Continued)

FOREIGN PATENT DOCUMENTS

EP 3790346 A1 * 3/2021 .......... H04W 74/002

*Primary Examiner* — Jamal Javaid
*Assistant Examiner* — Ryan C Kavleski
(74) *Attorney, Agent, or Firm* — Holland & Hart LLP

(57) ABSTRACT

This disclosure provides methods, devices and systems for wireless communication, and particularly, methods, devices and systems for multi-link operation. In some aspects, a first WLAN device (such as a non-AP STA) may establish with a second WLAN device (such as an AP) a multi-link association by which the first WLAN device can simultaneously transmit information to the second WLAN device via a first wireless communication link and a second wireless communication link. The first WLAN device may coordinate contention for the first wireless communication link by a first WLAN interface of the first WLAN device to be concurrent with contention for the second wireless communication link by a second WLAN interface of the first WLAN device.

19 Claims, 15 Drawing Sheets

(51) Int. Cl.
*H04L 5/00* (2006.01)
*H04W 80/02* (2009.01)
*H04W 84/12* (2009.01)

(58) Field of Classification Search
CPC ... H04L 1/1642; H04L 5/0055; H04L 1/0061;
H04L 1/1614; H04L 1/1835; H04L
1/1887; H04L 69/14; H04L 1/0008
See application file for complete search history.

(56) References Cited

U.S. PATENT DOCUMENTS

| | | | |
|---|---|---|---|
| 2013/0258931 A1* | 10/2013 | Gonikberg | H04W 8/005 |
| | | | 370/328 |
| 2014/0269461 A1 | 9/2014 | Mehta | |
| 2017/0070957 A1* | 3/2017 | Horibe | H04W 16/14 |
| 2017/0311204 A1 | 10/2017 | Cariou et al. | |
| 2019/0150214 A1 | 5/2019 | Zhou et al. | |
| 2020/0053773 A1* | 2/2020 | Seok | H04W 74/08 |
| 2020/0205199 A1* | 6/2020 | Newman | H04L 1/1887 |
| 2021/0029588 A1* | 1/2021 | Cariou | H04W 28/0263 |
| 2021/0076398 A1* | 3/2021 | Naribole | H04W 72/1257 |
| 2021/0076419 A1* | 3/2021 | Naribole | H04W 56/001 |
| 2021/0100051 A1 | 4/2021 | Ho et al. | |
| 2021/0127420 A1* | 4/2021 | Lu | H04W 76/15 |
| 2021/0136819 A1* | 5/2021 | Seok | H04W 72/0446 |
| 2021/0160958 A1 | 5/2021 | Patil et al. | |
| 2022/0124798 A1* | 4/2022 | Jauh | H04L 45/22 |

\* cited by examiner

SYNCHRONIZING MULTI-LINK COMMUNICATIONS IN A WIRELESS LOCAL AREA NETWORK (WLAN)

CROSS-REFERENCE TO RELATED APPLICATIONS

This Patent Applications claims priority to U.S. Provisional Patent Application No. 62/939,203 filed Nov. 22, 2019, entitled "FRAGMENTATION AND RETRANSMISSION FOR MULTI-LINK OPERATION IN A WIRELESS LOCAL AREA NETWORK (WLAN)" and assigned to the assignee hereof. The disclosure of the prior Applications is considered part of and are incorporated by reference in this Patent Applications.

TECHNICAL FIELD

This disclosure relates generally to wireless communication, and more specifically to multi-link operation in a wireless communication system.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

A STA may have a wireless communication link with an AP in response to authenticating with the AP and establishing a wireless session (also referred to as a wireless association, or simply "association") with the AP. The IEEE is considering new features and new connectivity protocols to improve throughput and reliability. For example, a WLAN communication system may utilize a multi-link operation in which multiple wireless communication links are established between two WLAN devices. Multi-link operation may enable greater throughput and resiliency. However, traditional techniques for fragmentation and retransmission of wireless communications may be inadequate for use with multi-link operation.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method for wireless communication by a first wireless local area network (WLAN) device of a wireless network. The method may include establishing between the first WLAN device and a second WLAN device a multi-link association by which the first WLAN device can simultaneously transmit information to a second WLAN device via a first wireless communication link and a second wireless communication link. The method also may include coordinating contention for the first wireless communication link by a first WLAN interface of the first WLAN device to be concurrent with contention for the second wireless communication link by a second WLAN interface of the first WLAN device.

In some implementations, coordinating the contention may include determining that the first WLAN interface has started contention for the first wireless communication link, and notifying the second WLAN interface to start contention for the second wireless communication link in response to determining that the first WLAN interface has started contention for the first wireless communication link.

In some implementations, the method may further include transmitting dummy information over the first wireless communication link until the second WLAN interface wins contention for the second wireless communication link.

In some implementations, the first WLAN interface and the second WLAN may coordinate contention by sharing information over an inter-interface communication link between the first WLAN interface and the second WLAN interface.

In some implementations, coordinating contention may include transmitting a first signal from the WLAN interface to the second WLAN interface via the inter-interface communication link to cause the second WLAN interface to contend for access to the second wireless communication link.

In some implementations, coordinating contention may include transmitting, to the second WLAN interface via the inter-interface communication link, a signal for the second WLAN interface to abort contention for the second wireless communication link.

In some implementations, coordinating contention may include providing, over the inter-interface communication link to the second WLAN interface, an indication of a length or transmission duration of information to be transmitted by the first WLAN interface.

In some implementations, the method may include transmitting first information to the second WLAN device over the first wireless communication link concurrently with second information to the second WLAN device over the second wireless communication link, where transmission of the second information terminates concurrently with transmission of the first information based, at least in part, on the indication of the length or duration of the first information.

In some implementations, the method may include transmitting first information over the first wireless communication link by the first WLAN interface concurrently with second information over the second wireless communication link by the second WLAN interface. The method also may transmit padding information over the first wireless communication link by the first WLAN interface until the second WLAN interface completes transmission of the second information over the second wireless communication link.

In some implementations, the method may include delaying contention on the first wireless communication link until a back-off counter associated with a second WLAN device reaches a value.

In some implementations, the method may include transmitting, by the first WLAN interface, first information over the first wireless communication link in response to a counter reaching a value.

In some implementations, the method may include delaying transmission of information over the first wireless communication link by the first WLAN interface in response to a back-off counter reaching a value.

Another innovative aspect of the subject matter described in this disclosure can be implemented in a wireless communication apparatus of a first wireless local area network (WLAN) device. The wireless communication apparatus can include one or more processors configured to establish between the first WLAN device and a second WLAN device a multi-link association by which the first WLAN device can simultaneously transmit information to a second WLAN device via a first wireless communication link and a second wireless communication link. The one or more processors also may be configured to coordinate contention for the first wireless communication link by a first WLAN interface of the first WLAN device to be concurrent with contention for the second wireless communication link by a second WLAN interface of the first WLAN device. The first WLAN interface may be configured to transmit at least a first portion of the information over the first wireless communication link to second WLAN device. The second WLAN interface may be configured to transmit at least a second portion of the information over the second wireless communication link to the second WLAN device.

In some implementations, the wireless communication apparatus may include an inter-interface communication link between the first WLAN interface and the second WLAN interface.

In some implementations, the first WLAN interface may be further configured to transmit a first signal to the second WLAN interface via the inter-interface communication link to cause the second WLAN interface to contend for access to the second wireless communication link.

In some implementations, the wireless communication apparatus may include a first transceiver coupled to the first WLAN interface. The wireless communication apparatus also may include a second transceiver coupled to the second WLAN interface and a plurality of antennas couple to the first transceiver and the second transceiver to wirelessly transmit signals output from the first transceiver and the second transceiver. The wireless communication apparatus also may include a housing that encompasses the one or more processors, the first WLAN interface, the second WLAN interface, the first transceiver, the second transceiver, and at least a portion of the plurality of antennas.

Another innovative aspect of the subject matter described in this disclosure can be implemented in a machine-readable storage medium including machine-readable program code that, when executed by a processor, causes the processor to perform operations for wireless communication. The machine-readable program code may include program code to establish between a first WLAN device and a second WLAN device a multi-link association by which the first WLAN device can simultaneously transmit information to a second WLAN device via a first wireless communication link and a second wireless communication link. The machine-readable program code also may include program code to coordinate contention for the first wireless communication link by a first WLAN interface of the first WLAN device to be concurrent with contention for the second wireless communication link by a second WLAN interface of the first WLAN device.

In some implementations, the machine-readable program code may include program code to transmit a first signal over an inter-interface communication link between the WLAN interface the second WLAN interface to cause the second WLAN interface to contend for access to the second wireless communication link.

In some implementations, the machine-readable program code may include program code to delay contention on the first wireless communication link until a back-off counter associated with a second WLAN device reaches a value.

In some implementations, the machine-readable program code may include program code to delay transmission of information over the first wireless communication link by the first WLAN interface in response to a back-off counter reaching a value.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

Like reference numbers and designations in the various drawings indicate like elements.

DETAILED DESCRIPTION

Figure 1:
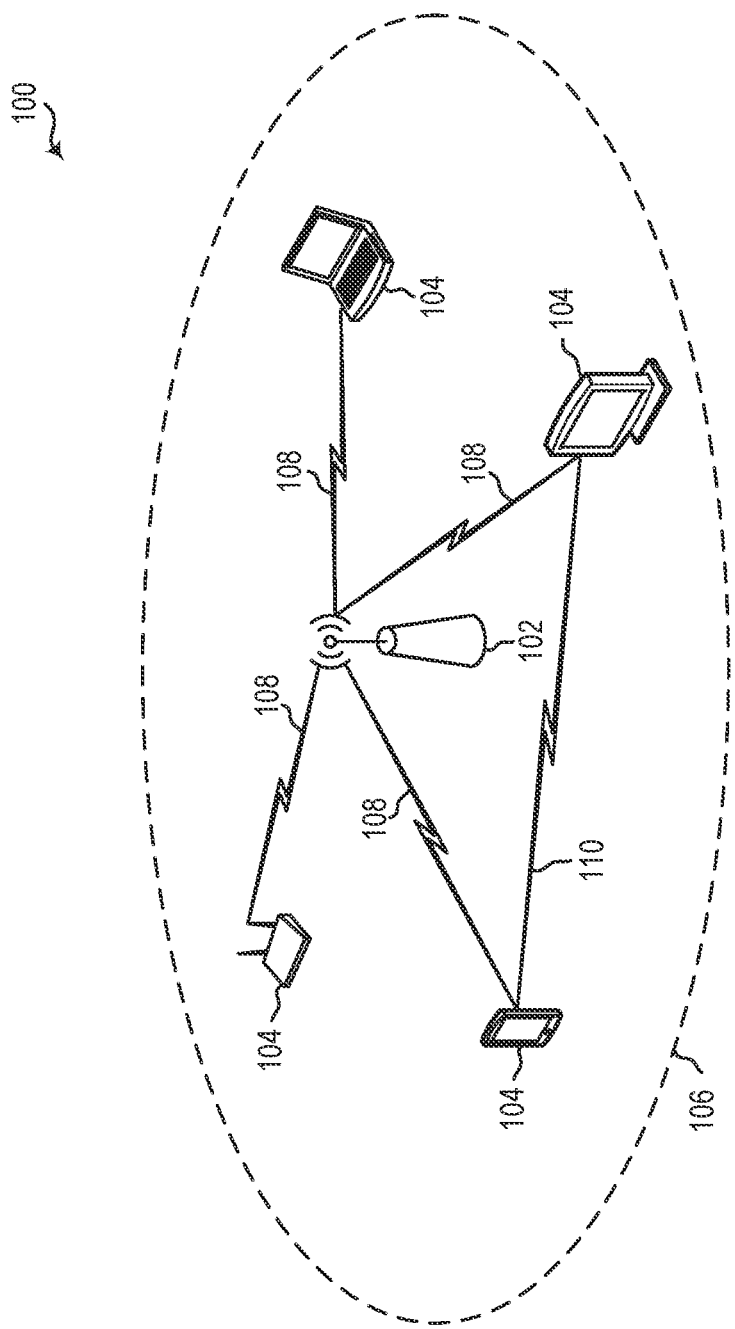
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (TOT) network.

A WLAN in a home, apartment, business, or other area may include multiple WLAN devices including access points (AP) and the stations (STAs) that they support. Each WLAN device may have one or more wireless communication interfaces to communicate with another WLAN device via a wireless communication medium. The wireless communication medium may include one or more wireless channels defined within a wireless frequency band (which may be referred to as a band for simplicity). An AP is a WLAN device that includes at least one wireless interface as well as a distribution system access function. A STA is a WLAN device that includes at least one wireless interface to communicate with an AP or another STA and that does not perform a distribution system access function. Each wireless communication interface may comprise an addressable entity that implements wireless communication protocols defined for the WLAN.

There has been increasing development in techniques for multi-link operation (also referred to as "multi-link communication") in which a WLAN device (such as a STA) may establish more than one concurrent communication link with another WLAN device (such as an AP or another STA). A multi-link device (MLD) is an AP or a STA having more than one interface and that supports more than one concurrent communication link with another MLD. The communication links may be established on different channels, frequency bands, or spatial streams, among other examples. For example, the two WLAN devices may establish a first communication link in a first frequency band (such as in the 2.4 GHz band) and establish a second, concurrent communication link in a second frequency band (such as in the 5 GHz band or the 6 GHz band).

In various implementations for multi-link operation described herein, the concurrent communication links may be established based on a single wireless association between MLDs (such as an AP and a STA). As such, according to some multi-link implementations, the MLDs may communicate via a plurality of communication links that share the same association identifier, the same temporal key, or both, among other examples. In contrast, using a traditional dual connectivity model, each communication link may require a different association identifier and a different temporal key for a session.

Some MLDs may be configured to concurrently transmit and receive information over multiple wireless links. These MLDs may be referred to as simultaneous transmit/receive (STR) devices. For example, an AP may be an STR device capable of receiving first information over a first wireless link while concurrently transmitting second information over a second wireless link, or vice versa. However, some MLDs (such as non-AP STAs) may not be capable of transmitting information over a first link while simultaneously receiving information over a second link (referred to as non-STR devices). Non-STR devices may not be equipped with certain filters and components that reduce interference arising from concurrently transmitting via a first wireless link while receiving information over a second wireless link. Instead of concurrently transmitting and receiving over separate links, some non-STR MLDs may be configured to synchronize operations of the multiple wireless links so that the multiple wireless links are either concurrently transmitting or concurrently receiving.

Various aspects of this disclosure relate generally to multi-link operation. More specifically, aspects of this disclosure relate to an MLD capable of concurrently transmitting or currently receiving information over multiple wireless communication links. In some aspects, a first WLAN device (such as a non-AP STA) may establish with a second WLAN device (such as an AP) a multi-link association by which the first WLAN device can simultaneously transmit information to the second WLAN device via a first wireless communication link and a second wireless communication link. The first WLAN device may coordinate contention for the first wireless communication link by a first WLAN interface of the first WLAN device to be concurrent with contention for the second wireless communication link by a second WLAN interface of the first WLAN device. In some implementations, the first WLAN device may coordinate contention by detecting that the first WLAN interface has started contending for the first wireless communication link and notifying the second WLAN interface to commence contention for the second wireless communication link. In some implementations, the first WLAN interface and second WLAN interface may begin and end transmissions at approximately the same time. For example, the first and second WLAN interfaces may commence or delay transmissions based on one or more counters. The first and second WLAN interfaces also may exchange information about the length or duration of information to be transmitted, so they may initiate or terminate transmissions at approximately the same time. In some implementations, the first and second WLAN interfaces may share information over an inter-interface communication link connecting the first and second WLAN interfaces.

Particular implementations of the subject matter described in this disclosure can be implemented to realize one or more of the following potential advantages. The described techniques enable non-STR MLDs to concurrently transmit or concurrently receive information over a plurality of wireless communication links. These techniques enable non-STR MLDs to achieve higher utilization and throughput than non-STR devices that do not perform concurrent multi-link transmission and receipt of information. This disclosure also describes techniques that enable multiple interfaces of a WLAN device to share information across an inter-interface communication link. By sharing information across the inter-interface communication link, WLAN devices can quickly and efficiently coordinate operations across multiple interfaces.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct wireless links 110. Additionally, two STAs 104 may communicate via a direct wireless link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11ah, 802.11ad, 802.11 ay, 802.11ax, 802.11az, 802.11ba and 802.11be). These standards define the WLAN radio and baseband protocols for the PHY and MAC layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple channels (which may be used as subchannels of a larger bandwidth channel as described below). For example, PPDUs conforming to the IEEE 802.11n, 802.11ac and 802.11ax standard amendments may be transmitted over the 2.4 and 5 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels (which may be referred to as subchannels).

Each PPDU is a composite structure that includes a PHY preamble and a payload in the form of a PLCP service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a first portion (or "legacy preamble") and a second portion (or "non-legacy preamble"). The first portion may be used for packet detection, automatic gain control and channel estimation, among other uses. The first portion also may generally be used to maintain compatibility with legacy devices as well as non-legacy devices. The format of, coding of, and information provided in the second portion of the preamble is based on the particular IEEE 802.11 protocol to be used to transmit the payload.

Figure 2:
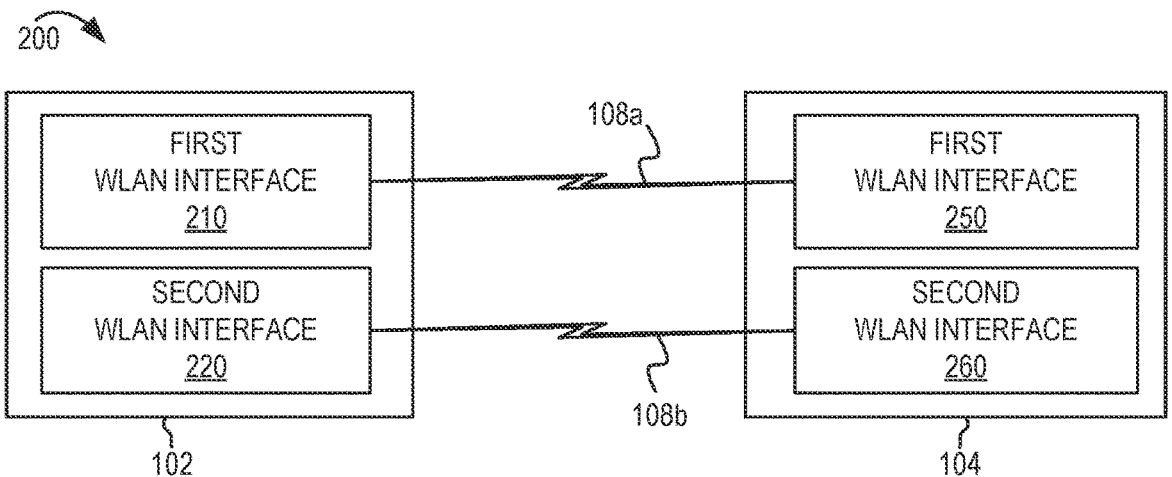
FIG. 2 shows a pictorial diagram of an example system that implements multi-link operation.

FIG. 2 shows a pictorial diagram of an example system 200 that implements multi-link operation. A first WLAN device (such as an AP 102) may include multiple wireless interfaces (such as a first WLAN interface 210 and a second WLAN interface 220). Although two WLAN interfaces are shown in the AP 102, there may be a different quantity of WLAN interfaces in various implementations. A second WLAN device (such as the STA 104) also may include multiple wireless interfaces (such as a first WLAN interface 250 and a second WLAN interface 260).

The STA 104 may establish multiple wireless communication links (shown as first wireless communication link 108a and second wireless communication link 108b) with the AP 102. For example, the first wireless communication link 108a may be established between the first WLAN interface 250 of the STA 104 and the first WLAN interface 210 of the AP 102. The second wireless communication link 108b may be established between the second WLAN interface 260 of the STA 104 and the second WLAN interface 220 of the AP 102.

Figure 3:
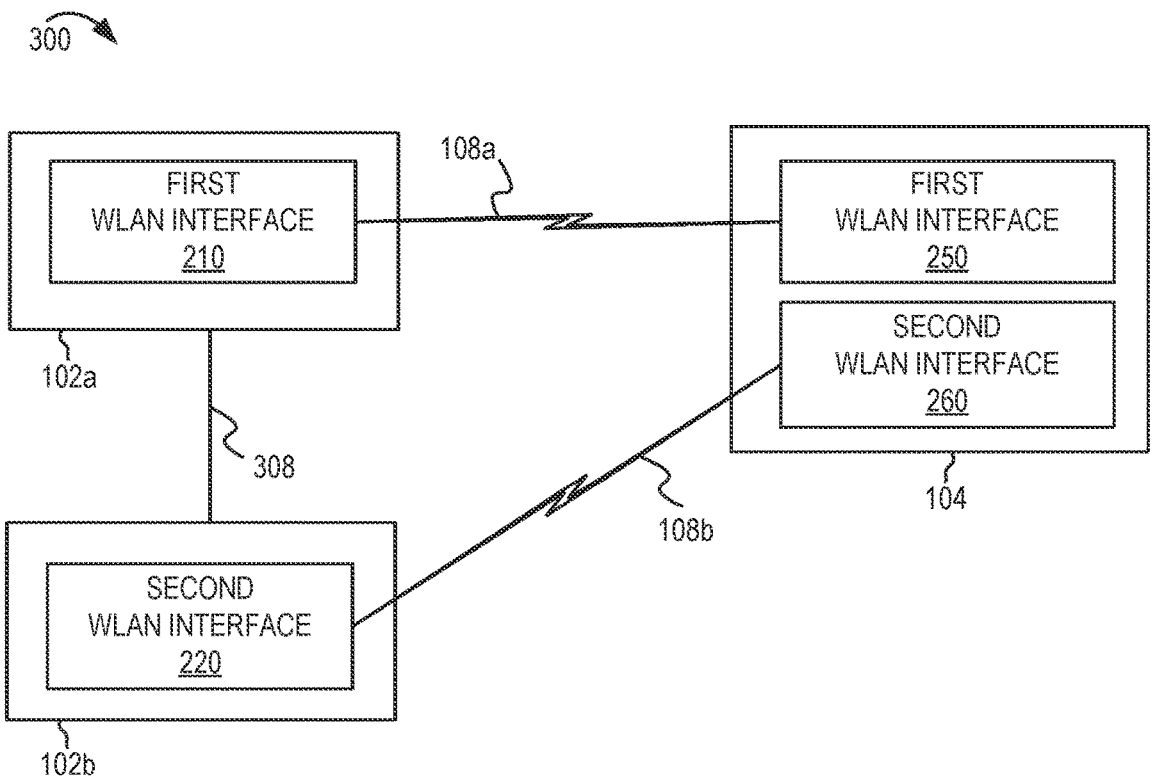
FIG. 3 shows a pictorial diagram of another example system that implements multi-link operation.

FIG. 3 shows a pictorial diagram of another example system 300 that implements multi-link operation. In the example system 300, the STA 104 may establish multiple wireless communication links 108a and 108b with non-collocated APs 102a and 102b, respectively. For example, the STA 104 may establish a first wireless communication link 108a to a first WLAN interface 210 (in a first AP 102a) using the first WLAN interface 250 of the STA 104. The STA 104 may establish a second wireless communication link 108b to a second WLAN interface 220 (in the second AP 102b) using the second WLAN interface 260 of the STA 104. The APs 102a and 102b may communicate with each other using a wired or wireless communication link 308. For example, the non-collocated APs 102a and 102b may coordinate multi-link operations for the STA 104 via the wired or wireless communication link 308.

Figure 4:
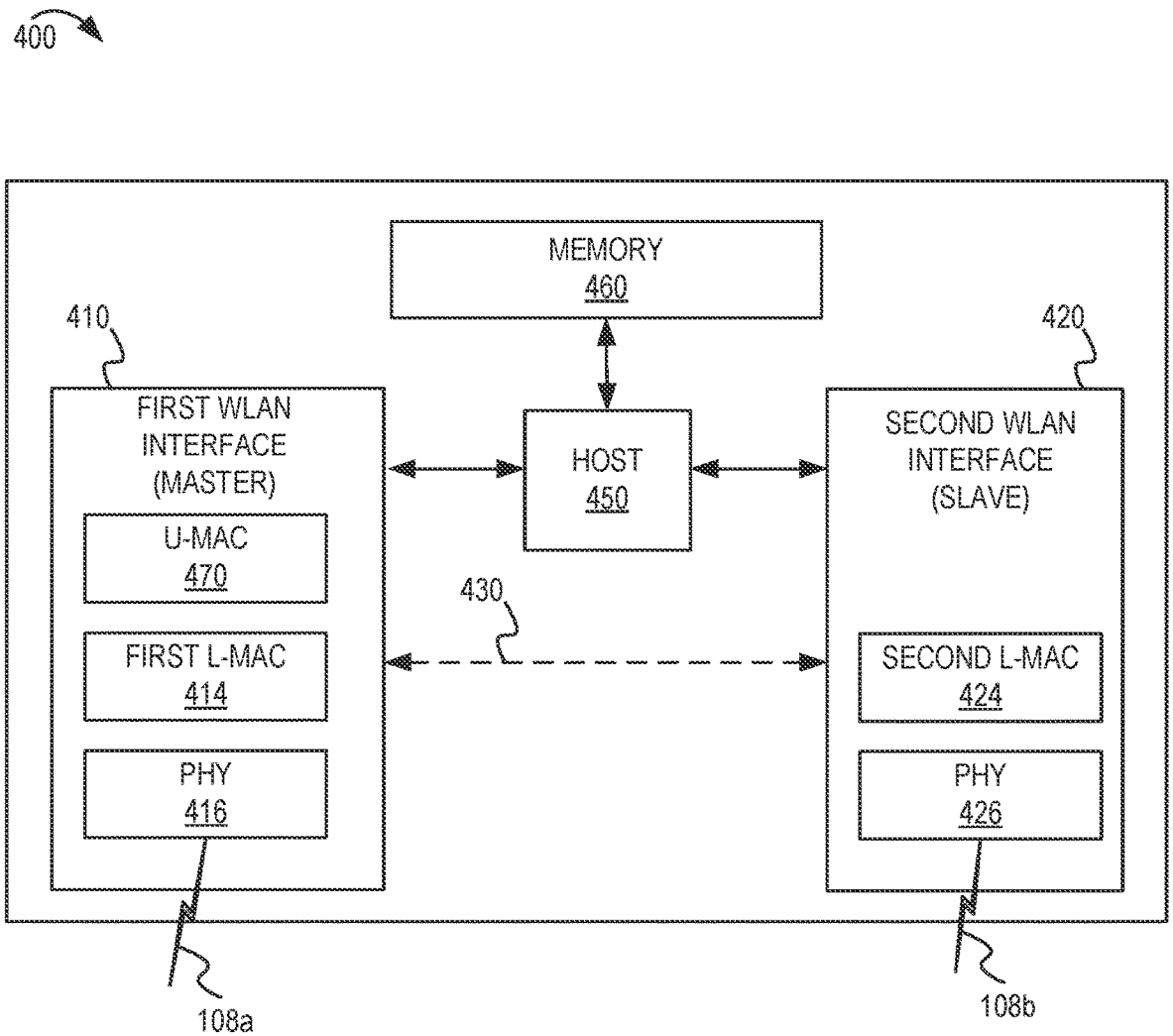
FIG. 4 shows a block diagram of an example wireless local area network (WLAN) device that supports multi-link operation.

FIG. 4 shows a block diagram of an example WLAN device 400 that supports multi-link operation. The WLAN device 400 may be a STA (such as STA 104) or an AP (such any of the APs 102 described herein). The WLAN device 400 includes a first WLAN interface 410 and a second WLAN interface 420. For example, the first WLAN interface 410 may be an example of the first WLAN interface 210 or the first WLAN interface 250 in FIGS. 2 and 3. The second WLAN interface 420 may be an example of the second WLAN interface 220 or the second WLAN interface 260 in FIGS. 2 and 3. In the example of FIG. 4, the first WLAN interface 410 acts as a master WLAN interface for a multi-link operation that includes the first WLAN interface 410 and the second WLAN interface 420. The second WLAN interface 420 may be a slave WLAN interface in the multi-link operation. A host 450 may operate as a relay to coordinate communication between the first WLAN interface 410 and the second WLAN interface 420. The WLAN device 400 may include memory 460 which is accessible by the host 450.

Multi-link operation typically relies on a MAC layer (also referred to as an upper MAC layer, or U-MAC) to coordinate the transmission of data via multiple lower MAC layers (L-MACs) at different WLAN interfaces. The first WLAN interface 410 may include a U-MAC layer 470. Although shown as part of the first WLAN interface 410, the U-MAC layer 470 may be part of the host 450 or in another element (not shown) of the WLAN device 400. The first WLAN interface 410 also includes a first lower MAC layer (first L-MAC) 414 and a PHY layer 416. In some implementations, an L-MAC layer may be referred to as a link MAC layer, and the U-MAC layer may be referred to as a network MAC layer.

The second WLAN interface 420 includes a second lower MAC layer (second L-MAC 424) and a PHY layer 426. Each WLAN interface 410 and 420 may be configured to establish a communication link with one or more other WLAN devices (not shown). The U-MAC layer 470 may coordinate which lower MAC (the first L-MAC 414 or the second L-MAC 424) will transmit or receive packets during a multi-link operation. The U-MAC layer 470 also may coordinate retransmissions or acknowledgements via the first L-MAC 414 or the second L-MAC 424 on behalf of the WLAN device 400. A packet may be transmitted as one or more frames (which also may be referred to as MAC protocol data units, or MPDUs) that include one or more MAC service data units (MSDUs). Each MSDU may include data from or to the host 450. The U-MAC layer 470 may determine encryption settings, addressing fields, or other parameters for each MPDU.

In some implementations, the WLAN device 400 may support direct communication between the first WLAN interface 410 and the second WLAN interface 420. For example, an inter-interface communication link 430 may enable the first WLAN interface 410 and the second WLAN interface 420 to coordinate some aspects of communication in the multi-link operation. The inter-interface communication link 430 may be a serial communication link, a pin line, or a parallel communication link, among other examples. In some implementations, the inter-interface communication link 430 may be used to coordinate timing for transmissions (or reception) by the two WLAN interfaces 410 and 420. For example, the inter-interface communication link 430 may address an issue with adjacent channel interference that could otherwise occur when one WLAN interface transmits at the same time that the other WLAN interface receives data. The inter-interface communication link 430 may be used by the first WLAN interface 410 to inform the second WLAN interface 420 when the first WLAN interface 410 is transmitting. If the second WLAN interface 420 has data to transmit for the multi-link operation, the second WLAN interface 420 may contend for channel access for the second wireless communication link 108*b*. In some implementations, if the second WLAN interface 420 may not have channel access for the second wireless communication link 108*b*, the second WLAN interface 420 may wait for the first WLAN interface 410 to complete its transmission before attempting to gain access to the channel.

In the multi-link operation, it may be desirable for both wireless communication links 108*a* and 108*b* to be in the same state (either transmitting or receiving). The inter-interface communication link 430 may be used to coordinate concurrent contention-based access via the respective wireless communication links 108*a* and 108*b*. For example, when one of the WLAN interfaces gains access to a wireless communication medium for a communication link, that WLAN interface may signal the other WLAN interface to attempt to gain contention-based access to another wireless communication medium for its respective communication link. In some implementations, each WLAN interface may use a counter to control when to contend for access in their respective communication links. When the counter counts to zero (0), the WLAN interface may signal the other WLAN interface via the inter-interface communication link 430 to indicate that it is beginning a contention procedure. In some implementations, the signal via the inter-interface communication link 430 may be sent a few counts (such as 2 or 3) before the counter reaches 0. If a WLAN interface loses contention (such as when another WLAN device begins transmitting), the inter-interface communication link 430 could be used to signal an abort of the contention procedure.

In some implementations, a first WLAN interface of a WLAN device may initiate transmission on a first wireless communication link when the link is idle and when a condition is met. The condition may be that a counter (such as a back-off counter) reaches zero on a slot boundary of a first wireless communication link. The condition may be that a counter associated with the first WLAN interface reaches zero and a counter associated with a second WLAN interface of the WLAN device reaches zero on a slot boundary of a second wireless link associated with the second interface. In some instances, although the counter reaches a particular value (such as zero), the first WLAN interface may not transmit information over the first wireless link and also maintain the counter at the value. In some instances, if a counter has reached zero, the WLAN device may initiate a new procedure by which it delays transmitting information.

In some implementations, a WLAN interface of a first WLAN device may delay contention for a wireless link until a counter (such as a back-off counter) associated with a second WLAN device reaches a certain value (such as 0). The first WLAN device may initialize the back-off counter based on any suitable information, such as a message received from the second WLAN device. In some implementations, the WLAN interface may delay transmission of information based on a back-off counter. Delaying the transmission may enable a first WLAN interface to synchronize transmission with a second WLAN interface that has not yet won contention to a link or that is otherwise unready for transmission.

In some implementations, when one WLAN interface wins contention, the WLAN interface may begin transmitting dummy data while waiting for the other WLAN interface to win contention for the multi-link operation. In some implementations, the inter-interface communication link 430 could also be used to communicate regarding the duration of a transmission opportunity (TXOP) or PPDU length. For example, it may be desirable for the first WLAN interface 410 and the second WLAN interface 420 to synchronize the end of the respective PPDUs that each of the interfaces transmit for the multi-link operation. The inter-interface communication link 430 could be used to indicate a length or duration of the PPDU transmission so that padding or other data may be transmitting during the same transmission window.

The architecture in FIG. 4 provides just one example of how multiple WLAN interfaces can be used for a multi-link operation. Other architectures or quantities of WLAN interfaces may be possible. For example, FIGS. 5 and 6 provide some example variations which are within the scope of this disclosure.

Figure 5:
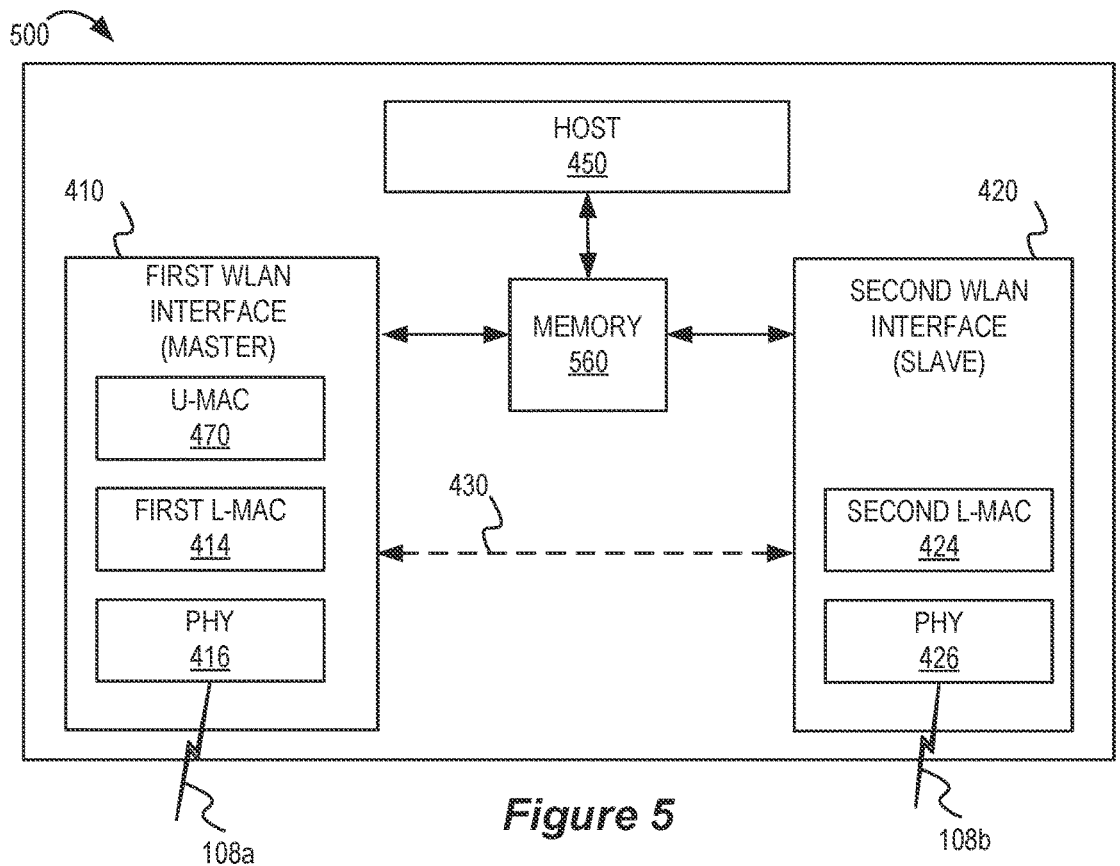
FIG. 5 shows a block diagram of another example WLAN device that supports multi-link operation using shared memory.

FIG. 5 shows a block diagram of an example WLAN device 500 that supports multi-link operation using a shared memory. Similar to FIG. 4, the WLAN device 500 includes a first WLAN interface 410 and a second WLAN interface 420. The host 450 may utilize a shared memory 560 to coordinate a multi-link operation using the first WLAN interface 410 and the second WLAN interface 420. The 560 may be is accessible and used by both the first WLAN interface 410 and the second WLAN interface 420 to store or retrieve buffered frames or packets. The host 450 may buffered frames or packets in different portions of the memory 560 for the WLAN interfaces 410 and 420 to retrieve and transmit. The WLAN interfaces 410 and 420 may store received packets in the memory 560 for the host 450 to retrieve and process. The other features of FIG. 5 are similar to the corresponding numbered features of FIG. 4.

Figure 6:
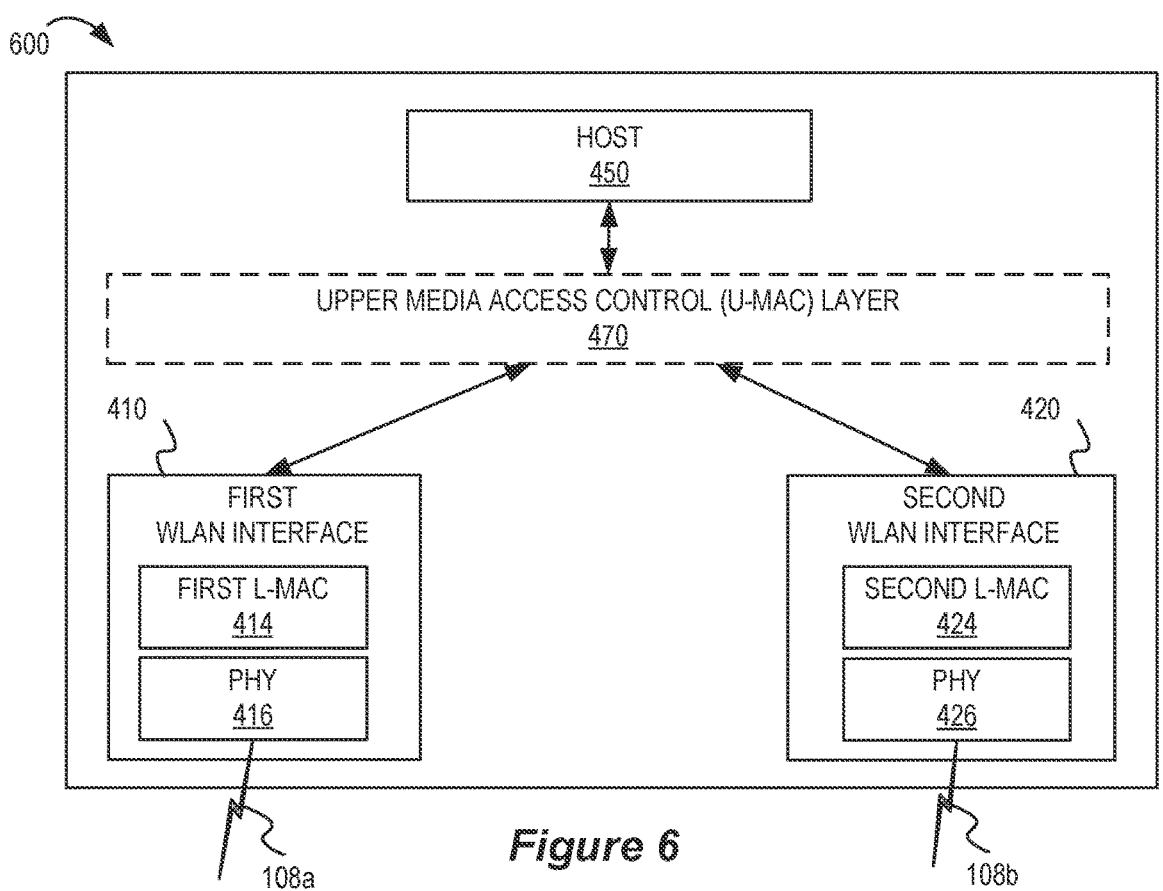
FIG. 6 shows a block diagram of another example WLAN device that supports multi-link operation using a system architecture.

FIG. 6 shows a block diagram of another example WLAN device 600 that supports multi-link operation using a system architecture. Similar to FIG. 4, the WLAN device 600 includes a first WLAN interface 410, a second WLAN interface 420, and a host 450. Furthermore, the WLAN device 600 includes a U-MAC layer 470. In some implementations, the U-MAC layer 470 may be implemented in the first WLAN interface 410, the second WLAN interface 420, the host 450, or in a separate component (not shown). Collectively, the first WLAN interface 410, the second WLAN interface 420, and the U-MAC layer 470 may be referred to as a multi-link layer entity (MLLE) or a multi-layer logical entity. The U-MAC layer 470 may provide a MAC service access point (MAC-SAP) that maintains a common association context (including security settings) and a common acknowledgement scheme that is used by both the first WLAN interface 410 and the second WLAN interface 420. The other features of FIG. 6 are similar to the corresponding numbered features of FIG. 4.

Figure 7:
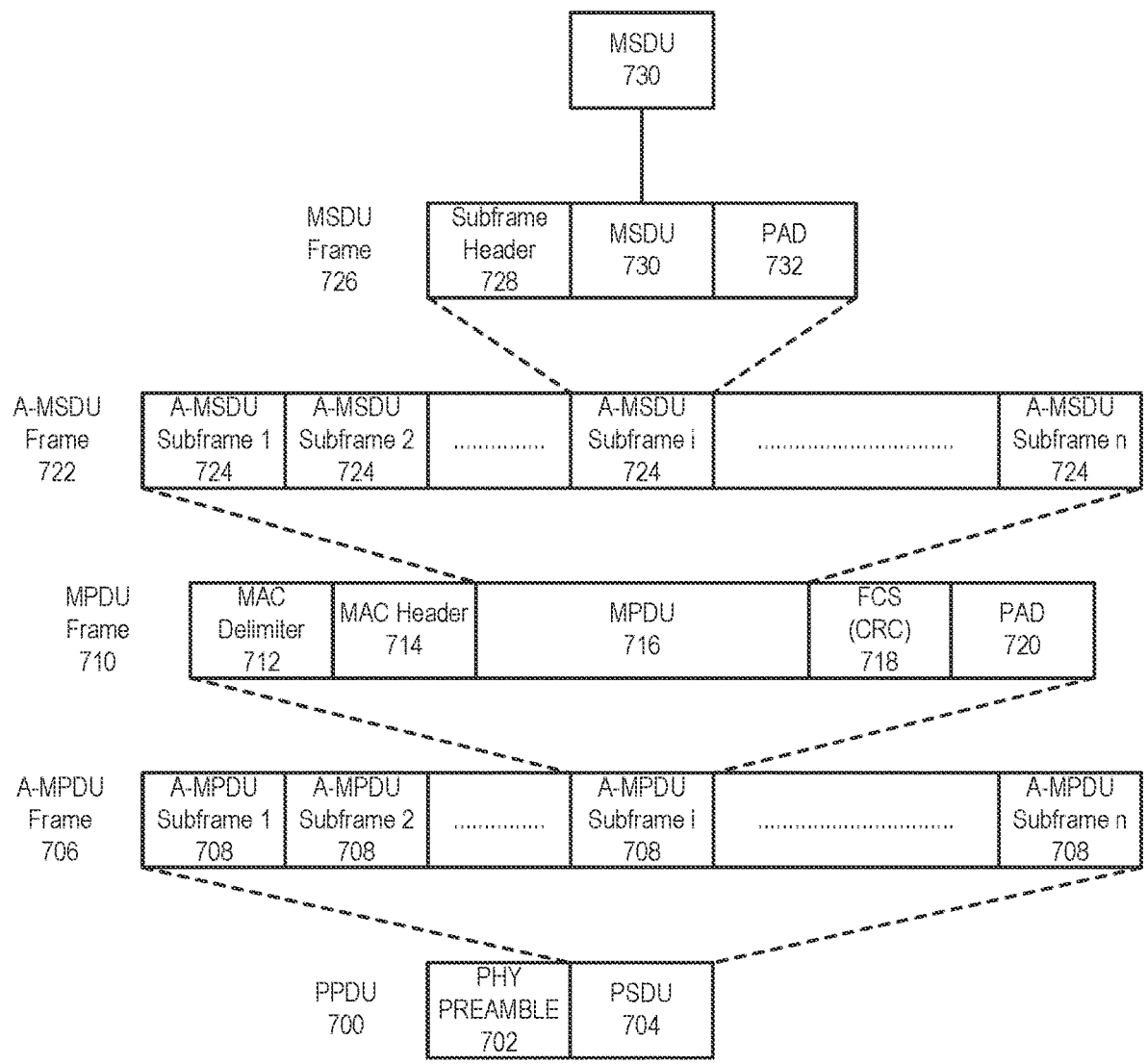
FIG. 7 shows an example of a physical layer convergence protocol (PLCP) protocol data unit (PPDU) usable for communications between an AP and a number of STAs.

FIG. 7 shows an example PPDU 700 usable for communications between an AP 102 and a number of STAs 104. As described above, each PPDU 700 includes a PHY preamble 702 and a PSDU 704. Each PSDU 704 may represent (or "carry") one or more MAC protocol data units (MPDUs) 716. For example, each PSDU 704 may carry an aggregated MPDU (A-MPDU) 706 that includes an aggregation of multiple A-MPDU subframes 708. Each A-MPDU subframe 706 may include an MPDU frame 710 that includes a MAC delimiter 712 and a MAC header 714 prior to the accompanying MPDU 716, which comprises the data portion ("payload" or "frame body") of the MPDU frame 710. Each MPDU frame 710 may also include a frame check sequence (FCS) field 718 for error detection (for example, the FCS field may include a cyclic redundancy check (CRC)) and padding bits 720. The MPDU 716 may carry one or more MAC service data units (MSDUs) 716. For example, the MPDU 716 may carry an aggregated MSDU (A-MSDU) 722 including multiple A-MSDU subframes 724. Each A-MSDU subframe 724 contains a corresponding MSDU 730 preceded by a subframe header 728 and in some cases followed by padding bits 732.

Referring back to the MPDU frame 710, the MAC delimiter 712 may serve as a marker of the start of the associated MPDU 716 and indicate the length of the associated MPDU 716. The MAC header 714 may include a number of fields containing information that defines or indicates characteristics or attributes of data encapsulated within the frame body of the MPDU 716. The MAC header 714 includes a duration field indicating a duration extending from the end of the PPDU until at least the end of an acknowledgment (ACK) or Block ACK (BA) of the PPDU that is to be transmitted by the receiving wireless communication device. The use of the duration field serves to reserve the wireless medium for the indicated duration and enables the receiving device to establish its network allocation vector (NAV). The MAC header 714 also includes a number of fields indicating addresses for the data encapsulated within the frame body 716. For example, the MAC header 714 may include a combination of a source address, a transmitter address, a receiver address, or a destination address. The MAC header 714 may further include a frame control field containing control information. The frame control field may specify a frame type, for example, a data frame, a control frame, or a management frame.

Figure 8:
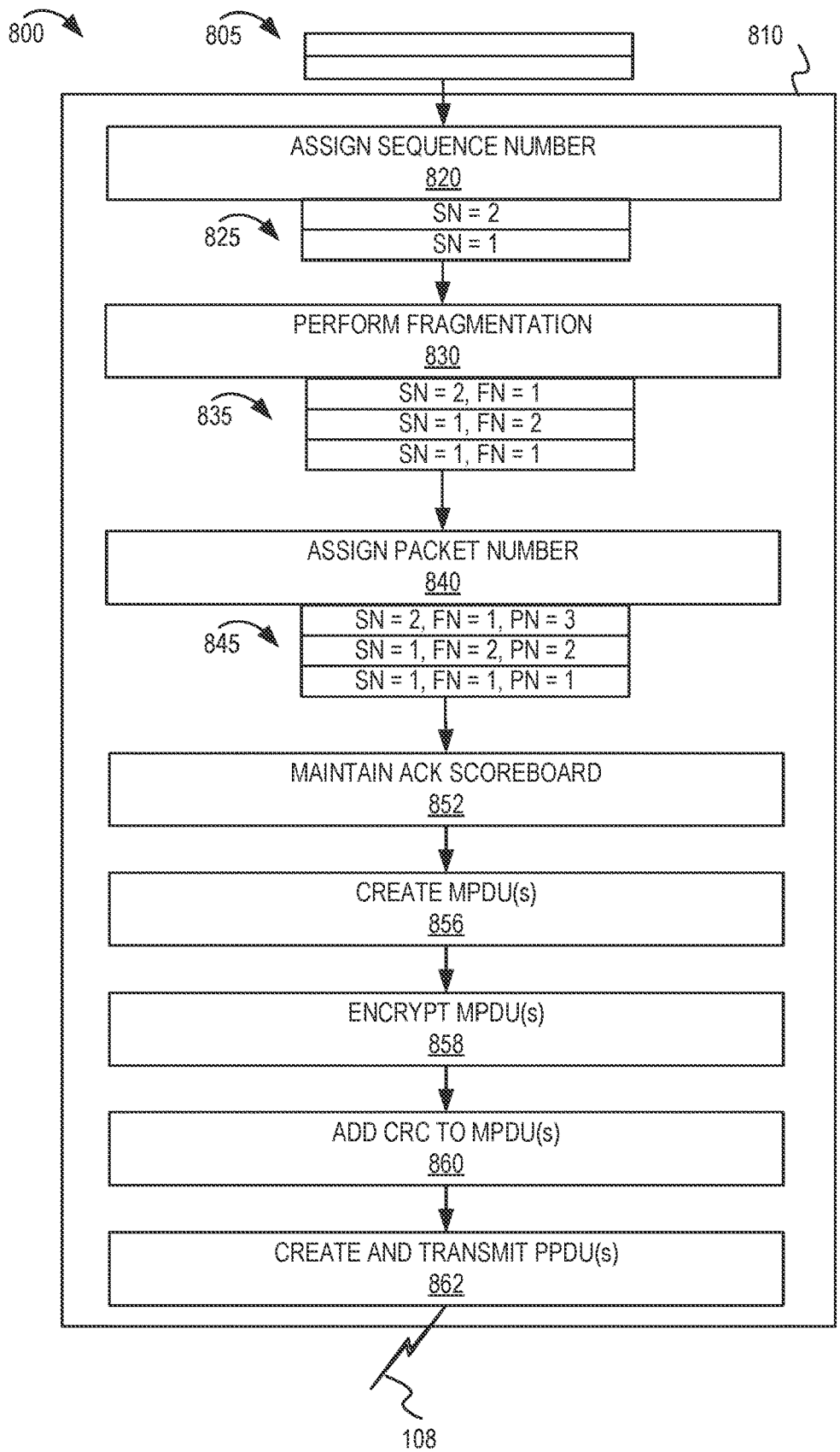
FIG. 8 shows a block diagram of an example media access control (MAC) process for a single WLAN interface.

FIG. 8 shows a block diagram of an example media access control (MAC) process 800 for a single WLAN interface. For example, the WLAN interface 810 may be used with a single wireless communication link 108 that is not part of a multi-link operation. Typically, the WLAN interface 810 receives a plurality of MSDUs 805 from a higher layer (not shown) of a WLAN device. At block 820, the WLAN interface 810 may assign sequence numbers to the MSDUs. For example, MSDUs 825 have been numbered using sequential and consecutive sequence numbers (shown as SN=1 and SN=2). Then, at block 830, the WLAN interface 810 may perform fragmentation. For example, the WLAN interface 810 may fragment a first MSDU (having SN=1) into two individually addressed MPDUs. The fragmentation allows for fragment retransmission. A fragment is an MPDU, the Frame Body field of which carries only a portion of an MSDU. Shown in MPDUs 835, the first MSDU (having SN=1) has been fragmented and each fragment numbered (FN=1 and FN=2). A second MSDU (having SN=2) is unfragmented and is assigned a default fragment number (FN=1).

Next, at block 840, the WLAN interface 810 may assign packet numbers to each MPDU. In this example, each MPDU is assigned a sequential and consecutive PN. The MPDUs 845 are shown with their previously assigned sequence number, fragment number, and the newly assigned packet number (shown as PN=1, PN=2, and PN=3). At block 852, the WLAN interface 810 may maintain an acknowledgement scoreboard based on the packet numbers. For example, the WLAN interface 810 may track which PNs are acknowledged (or not acknowledged) so that particular MPDUs may be retransmitted. Thus, if a receiver (not shown) receives the MPDUs having PN=2 and PN=3 but does not receive the MPDU having PN=1, the WLAN interface 810 may transmit the MPDU having PN=1. Because each fragment is associated with a different PN, it is possible for the WLAN interface 810 to retransmit only a fragment of an MSDU which improves throughput.

At block 856, the WLAN interface 810 may create plaintext MPDUs based on the MPDUs 845 that have assigned sequence numbers, fragment numbers, and packet numbers. The plaintext MPDUs include appending or adding the SN, FN, and PN (such as in a header field) to the original MPDUs. At block 858, the WLAN interface 810 may encrypt the plaintext MPDUs. The encryption process may include generating an encryption nonce based on the PN for each MPDU.

At block 860, the WLAN interface 810 may add a cyclic redundancy check (CRC) to the encrypted MPDUs. At block 862, the WLAN interface 810 may generate one or more PPDUs to carry the encrypted MPDUs and transmit the PPDUs via the wireless communication link 108. For example, each PPDU may include one encrypted MPDU or a plurality of encrypted MPDUs (such as in an A-MPDU).

Because the WLAN interface 810 performs the fragmentation and packet numbering for the single wireless communication link 108, it can manage assignment of packet numbers for each fragment so that each fragment has a different packet number. However, the techniques described in FIG. 8 are inadequate for multi-link operation because multiple WLAN interfaces may be used for a multi-link operation.

When using multi-link operation, a U-MAC may coordinate transmissions of MPDUs via different L-MAC layers associated with different wireless communication links. Fragmentation (and fragment retransmission) may be handled differently by each L-MAC. Meanwhile, there is a need to ensure different PNs for each MPDU transmitted in the multi-link operation. The packet numbering may be performed at a U-MAC layer before the MPDUs are sent to one of a plurality of L-MACs. Unless the packet numbering technique is modified to accommodate fragmentation at the L-MAC, there is a possibility of repeated PNs which would compromise security and impact an ability for fragment retransmission.

Figure 9:
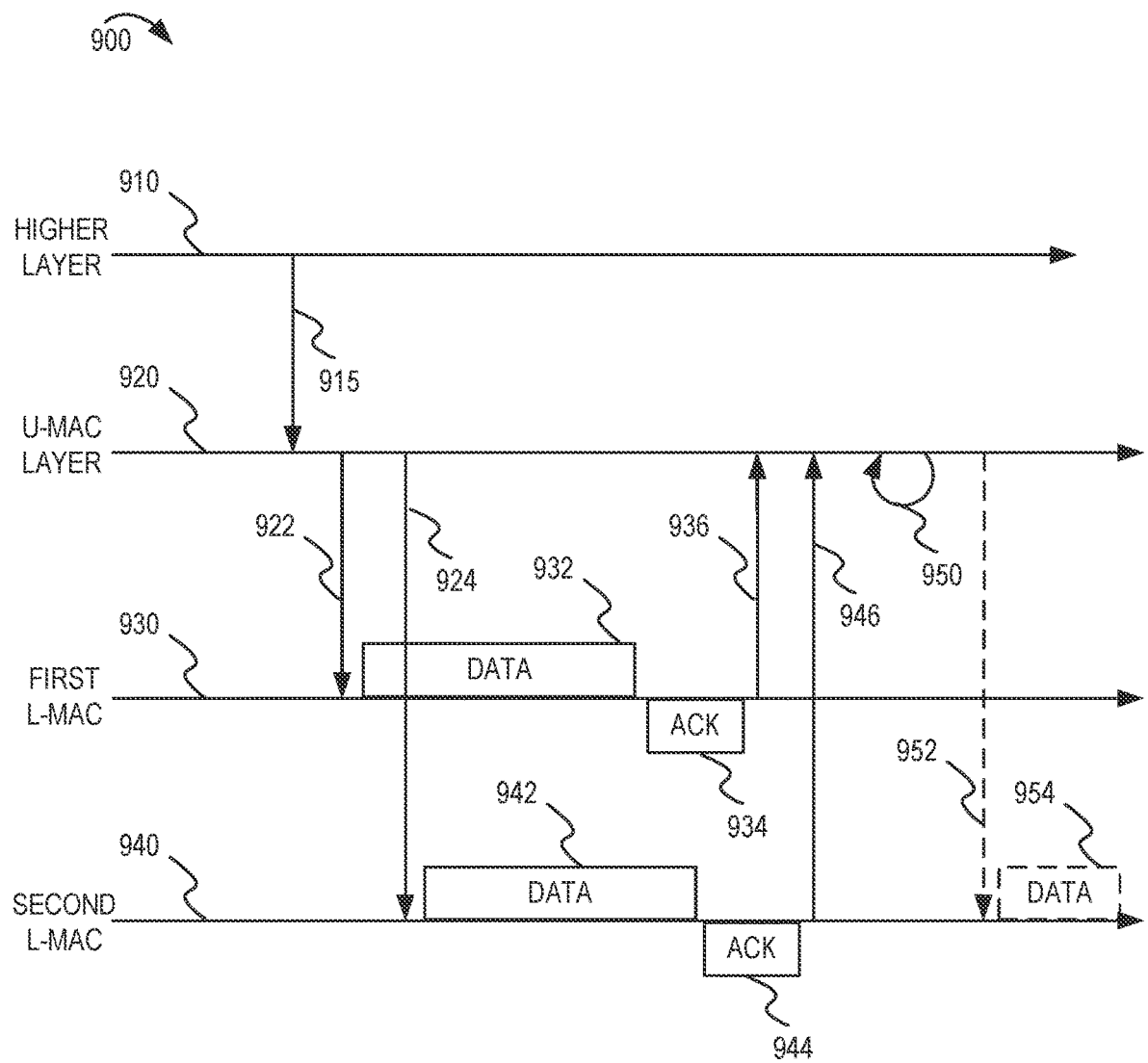
FIG. 9 shows a timing diagram in which an upper MAC (U-MAC) layer may use a plurality of WLAN interfaces according to some implementations.

FIG. 9 shows a timing diagram 900 in which a U-MAC layer may use a plurality of WLAN interfaces according to some implementations. The U-MAC layer 920 may receive a plurality of MSDUs 915 from a higher layer 910 of the first WLAN device. The U-MAC layer 920 may prepare MPDUs based on the MSDUs 915 and determine which L-MAC (such as the first L-MAC 930 or the second L-MAC 940) will transmit particular MPDUs.

In FIG. 9, the U-MAC layer 920 has send a first plurality of MPDUs 922 to the first L-MAC 930 for transmission to a second WLAN device. The first L-MAC 930 may perform fragmentation and renumber the PNs of the MPDUs 922. The first L-MAC 930 may transmit one or more PPDUs (shown as data 932) to the second WLAN device and receive a first acknowledgement 934 from the second WLAN device. In some implementations, the first L-MAC 930 may retransmit (not shown) one or more of the MPDUs based on the first acknowledgement 934. The first L-MAC 930 may provide a report 936 regarding a success or failure (based on the first acknowledgement 934 and any retransmissions, if any) of the transmission of the MPDUs 922 to the U-MAC layer 920.

Similar to the first L-MAC 930, the second L-MAC 940 also may transmit a plurality of MPDUs. For example, the U-MAC layer 920 may send a second plurality of MPDUs 924 to the second L-MAC 940 for transmission to the second WLAN device. The second L-MAC 940 may perform fragmentation and renumber the PNs of the MPDUs 924. The second L-MAC 940 may transmit one or more PPDUs (shown as data 942) to the second WLAN device and receive a second acknowledgement 944 from the second WLAN device. In some implementations, the second L-MAC 940 may retransmit (not shown) one or more of the MPDUs based on the second acknowledgement 944. The second L-MAC 940 may provide a report 946 regarding a success or failure (based on the second acknowledgement 944 and any retransmissions, if any) of the transmission of the MPDUs 924 to the U-MAC layer 920.

While the L-MACs 930 and 940 may manage link layer retransmissions of MPDUs (including fragments) based on packet numbers, the U-MAC layer 920 may manage retransmission of MSDUs based on sequence numbers. For example, a block acknowledgement (not shown) or another acknowledgement message may indicate which SNs have been received or have not been received. Alternatively, or additionally, the U-MAC layer 920 may determine failed MSDUs based on the reports 936 and 946 from the L-MACs 930 and 940, respectively. At block 950, the U-MAC layer 920 may determine to retransmit one or more MPDUs associated with failed MSDUs. The U-MAC layer 920 may cause retransmission of the MPDUs via either L-MAC 930 or 940. For example, the U-MAC layer 920 may provide a plurality of MPDUs 952 (associated with MSDUs that were originally transmitted via the first L-MAC 930) to the second L-MAC 940 for retransmission (shown as data 954). To enable fragmentation of MSDUs by each L-MAC and to ensure that retransmissions are given unique packet numbers by each L-MAC, the U-MAC layer 920 may assign a pool of PNs for each packet that it sends to the L-MACs. The size of the PN pool assigned to the packet may depend on the maximum fragmentation size of each L-MAC, the channel conditions, and a retransmission protocol, among other examples.

Figure 10:
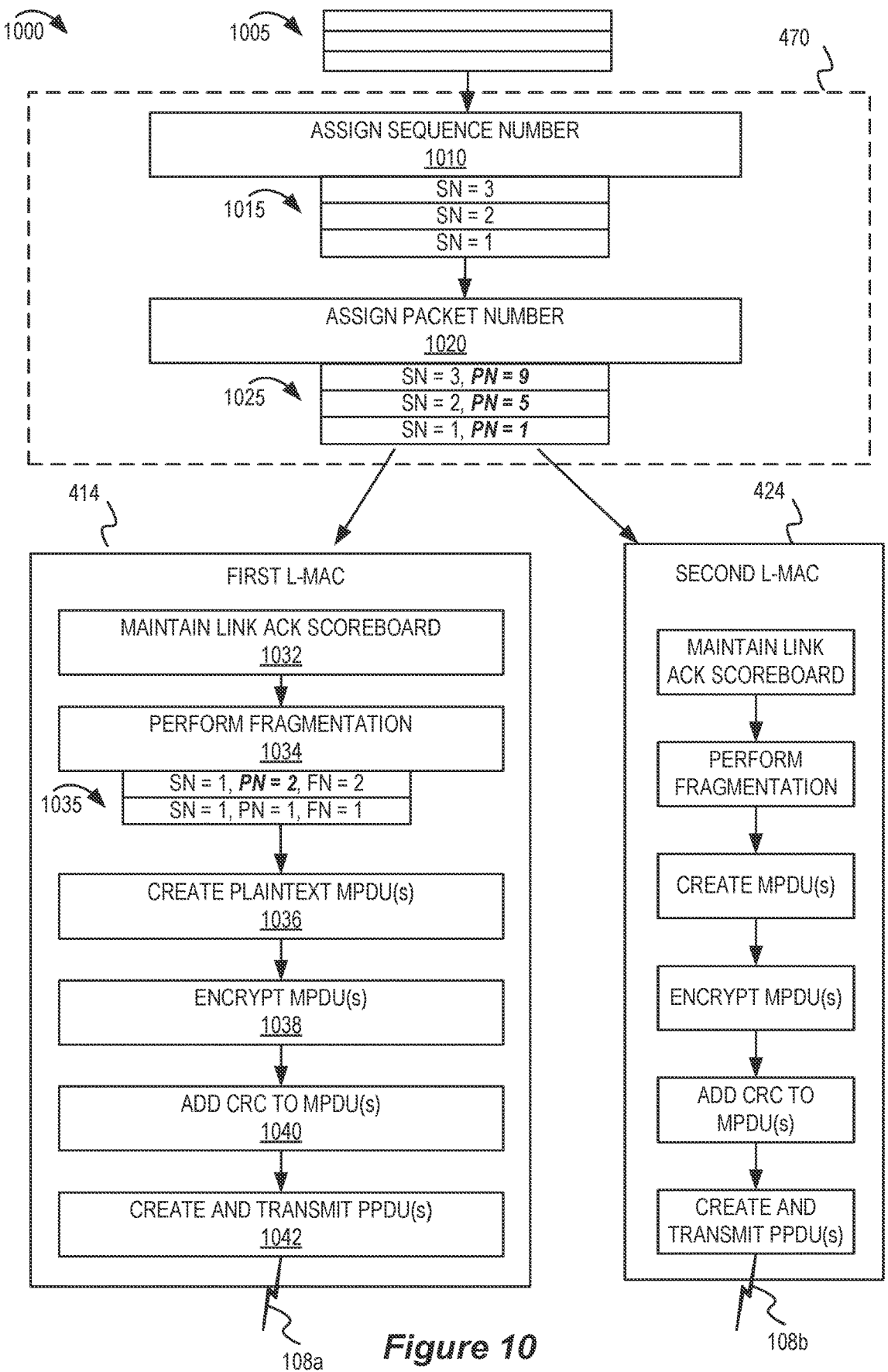
FIG. 10 shows a block diagram of an example transmit process for a multi-link operation according to some implementations.

FIG. 10 shows a block diagram of an example transmit process 1000 for a multi-link operation according to some implementations. For clarity, FIG. 10 shows the U-MAC layer 470, the first L-MAC 414 and the second L-MAC 424 as separate entities. As described above, in some implementations, the U-MAC layer 470, the first L-MAC 414, and the second L-MAC 424 may be implemented in a first WLAN interface, a second WLAN interface, or a host. The U-MAC layer 470 may receive a plurality of MSDUs 1005 from a higher layer (not shown). In block 1010, the U-MAC layer 470 may assign sequence numbers to the MSDUs. For example, the MSDUs 1015 have been numbered using sequential and consecutive sequence numbers (shown as SN=1, SN=2, and SN=3). Different from the example in FIG. 8, in FIG. 10, the U-MAC layer 470 may not perform fragmentation. Rather, fragmentation may be performed separately by each of the L-MACs later in the transmit process 1000. At block 1020, the U-MAC layer 470 may prepare full-size MPDUs 1025 corresponding to the MSDUs 1015 and assign packet numbers to each full-size MPDU. Rather than assigning sequential and consecutive PNs to the full-size MPDUs 1025, the U-MAC layer 470 may assign a pool of PNs to each MPDU. For example, the U-MAC layer 470 may skip a plurality of intermediate packet numbers between each subsequently assigned packet number. In the example of FIG. 10, the full-size MPDUs 1025 have been assigned packet numbers 1, 5, and 9 (skipping PNs 2, 3, 4, 6, 7, and 8). The quantity of skipped intermediate packet numbers may vary in different implementations. In some implementations, the quantity of skipped intermediate packet numbers may be based on a technical specification. Alternatively, or additionally, the quantity of skipped intermediate packet numbers may be based on a configuration setting for a multi-link operation or based on collected link quality or channel condition metrics for each of the wireless communication links 108a and 108b.

The U-MAC layer 470 may distribute the MPDUs 1025 to the first L-MAC 414 or the second L-MAC 424. In the example shown in FIG. 10, a first MPDU having SN=1 (and PN=1) may be sent to the first L-MAC 414. For brevity, the operations performed by the L-MACs are described with reference to the first L-MAC 414. However, similar operations may be performed by the second L-MAC 424. At block 1032, the first L-MAC 414 may maintain an acknowledgement scoreboard based on the packet numbers. In some implementations, the acknowledgement scoreboard can also track the skipped intermediate packet numbers which may be assigned during fragmentation by the first L-MAC 414. At block 1034, the first L-MAC 414 may perform fragmentation. In the example of FIG. 10, the first MPDU (having SN=1) may be fragmented into two individually addressed MPDUs. The fragments may be given fragment numbers (such as FN=1 and FN=2). A first MPDU (for a first fragment) may retain the PN (PN=1) assigned by the U-MAC layer 470. However, each fragment must be associated with a different PN to support fragment retransmission. Therefore, at block 1034, the first L-MAC 414 may renumber a second MPDU (for a second fragment) to use one of the skipped intermediate packet numbers (shown as PN=2*). Because the U-MAC layer 470 skipped intermediate packet numbers 2, 3, and 4 before assigning PN=5 to a next MPDU, those intermediate packet numbers are available for the first L-MAC 414 to assign to fragments of the MPDU that had PN=1.

At block 1036, the first L-MAC 414 may create plaintext MPDUs based on the MPDUs 1035 that have assigned sequence numbers, fragment numbers, and packet numbers. The plaintext MPDUs include appending or adding the SN, FN, and PN (such as in a header field) to the MPDUs. At block 1038, the first L-MAC 414 may encrypt the plaintext MPDUs. The encryption process may include generating an encryption nonce based on the PN for each MPDU.

At block 1040, the first L-MAC 414 may add a cyclic redundancy check (CRC) to the encrypted MPDUs. At block 1042, the first L-MAC 414 may generate one or more PPDUs to carry the encrypted MPDUs and transmit the PPDUs via the first wireless communication link 108a. For example, each PPDU may include one encrypted MPDU or a plurality of encrypted MPDUs (such as in an A-MPDU).

By skipping intermediate packet numbers at the U-MAC layer 470, those skipped packet numbers may be assigned by the L-MACs 414 and 424 during fragmentation. Fragmentation scheme and size may be determined dynamically by each of the L-MACs 414 and 424 based on local link conditions. Furthermore, the fragmentation scheme or size may be updated quickly by each L-MAC—thus avoiding latencies which may otherwise be involved with each L-MAC reporting link conditions to the U-MAC layer if the U-MAC layer were to perform the fragmentation.

Figure 11:
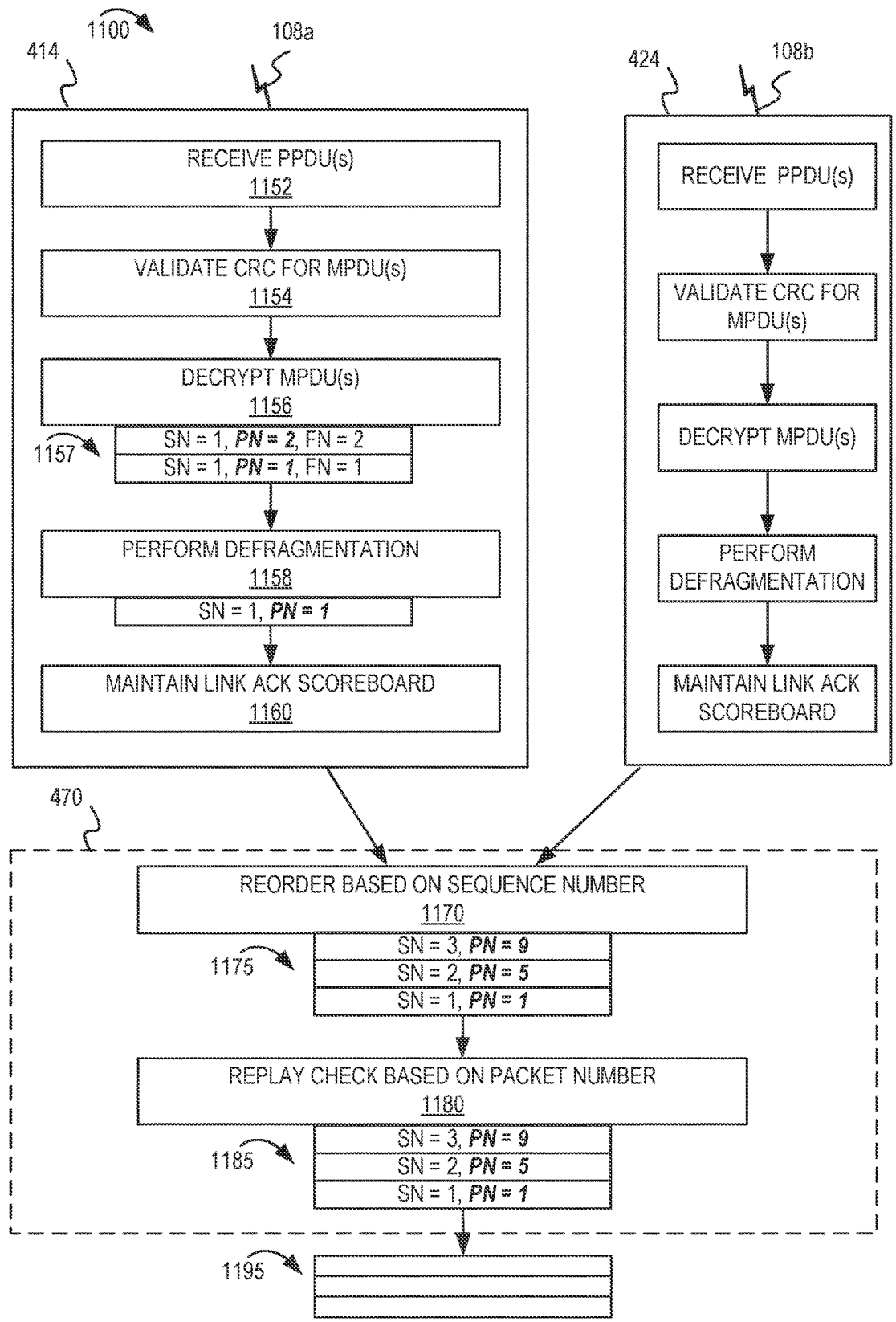
FIG. 11 shows a block diagram of an example receive process for a multi-link operation according to some implementations.

FIG. 11 shows a block diagram of an example receive process 1100 for a multi-link operation according to some implementations. A first L-MAC 414 and a second L-MAC 424 may receive PPDUs (with encrypted, fragmented MPDUs) via a first wireless communication link 108b and a second wireless communication link 108b, respectively. For brevity, the receive process 1102 will be described with reference to the first L-MAC 414. However, similar operations may be performed by the second L-MAC 424. At block 1152, the first L-MAC 414 may receive one or more PPDUs via the first wireless communication link 108a. At block 1154, the first L-MAC 414 may validate the CRC for each encrypted MPDU in the PPDUs. At block 1156, the first L-MAC 414 may decrypt the encrypted MPDUs to obtain two unencrypted MPDUs (which have packet numbers PN=1 and PN=2). The unencrypted MPDUs also may have fragment numbers associated with them (FN=1 and FN=2). At block 1158, the first L-MAC 414 may perform defragmentation to reconstruct the original full-size MPDU (having SN=1 and PN=1). In some implementations, the lowest PN from among the fragments may be used for the original full-size MPDU. In some implementations, the first L-MAC 414 may be aware of the quantity of skipped intermediate packet numbers and determine the packet number for the full-size MPDU based on unskipped packet numbers. The full-size MPDU may be sent to the U-MAC layer 3110. At block 1160, the first L-MAC 414 may maintain a link acknowledgement scoreboard. The link acknowledgement scoreboard may be used to provide an acknowledgement message back to a transmitter regarding which PNs have been received or which PNs have not been received.

At block 1170, the U-MAC layer 470 may reorder the full-size MPDUs 1175 (received from either the first L-MAC 414 or the second L-MAC 424) based on their sequence numbers. At block 1180, the U-MAC layer 3110 may perform a replay check based on the packet numbers after the MPDUs 1185 have been reordered based on the SNs. The PNs should be increasing with no repeated PNs in order to determine that no replay attack has been detected. If there is a repeated PN or a decreasing PN (after reordering based on SN), the U-MAC layer 3110 may determine that a replay attack has been detected and that security of the multi-link operation is compromised. In some implementations, at block 1180, the U-MAC layer 470 may determine whether the PNs are increasing according to a pattern based on the quantity of skipped packet numbers specified by a technical standard or configuration setting. If no replay attack is detected, the U-MAC layer 470 may determine MSDUs 1195 from the sorted MPDUs and send the MSDUs 1195 to a higher layer (not shown).

Figure 12:
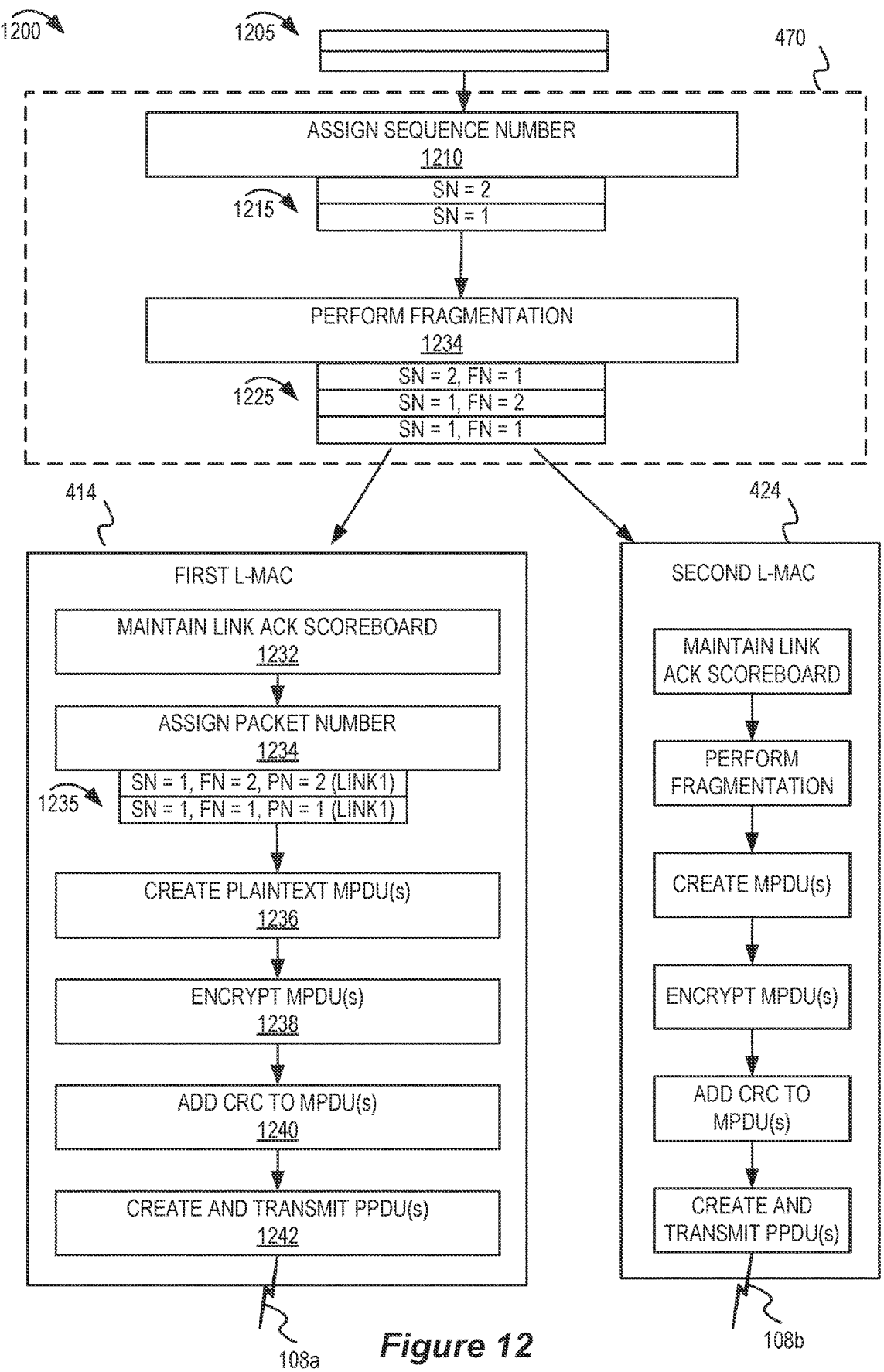
FIG. 12 shows a block diagram of another example transmit process for a multi-link operation according to some implementations.

FIG. 12 shows a block diagram of another example transmit process 1200 for a multi-link operation according to some implementations. In the example transmit process 1201, fragmentation may be performed by the U-MAC layer 470. So that unique PNs can be assigned and used for fragment retransmission, the PNs may be assigned by each of the L-MACs 414 and 424. The PNs assigned by the L-MACs 414 and 424 may be link-specific such that each L-MAC assigns PNs that are specific to each wireless communication link.

For clarity, FIG. 12 shows the U-MAC layer 470, the first L-MAC 414 and the second L-MAC 424 as separate entities. As described above, in some implementations, the U-MAC layer 470 may be implemented in a first WLAN interface, a second WLAN interface, or as part of the host (not shown). The U-MAC layer 470 may receive a plurality of MSDUs 1205 from a higher layer (not shown). In block 1210, the U-MAC layer 470 may assign sequence numbers to the MSDUs. For example, the MSDUs 1215 have been numbered using sequential and consecutive sequence numbers (shown as SN=1 and SN=2). At block 1234, the U-MAC layer 470 may perform fragmentation to produce a plurality of MPDUs 1225. The MPDUs 1225 may retain the SN from their parent and may be assigned fragment numbers. For example, a first MPDU (having SN=1) may be fragmented into two MPDUs (having FN=1 and FN=2).

The U-MAC layer 470 may distribute the MPDUs 1225 to the first L-MAC 414 or the second L-MAC 424. In the example shown in FIG. 12, the MPDUs having SN=1 (both fragments FN=1 and FN=2) may be sent to the first L-MAC 414. At block 1232, the first L-MAC 414 may maintain an acknowledgement scoreboard based on the packet numbers that are specific to the first wireless communication link 108a at the first L-MAC 414. At block 1234, the first L-MAC 414 may assign packet numbers to each MPDU. In some implementations, the packet numbers may be sequential and consecutive (such as PN=1 and PN=2, as shown in FIG. 12). In some implementations, a link identifier (Link ID) or other indicator may be used to identify the PNs as belonging to a separate set of PNs that are specific to the first wireless communication link 108a.

At block 1236, the first L-MAC 414 may create plaintext MPDUs based on the MPDUs 1235 that have assigned sequence numbers, fragment numbers, and packet numbers. The plaintext MPDUs include appending or adding the SN, FN, and PN (such as in a header field) to the MPDUs. At block 1238, the first L-MAC 414 may encrypt the plaintext MPDUs. The encryption process may include generating an encryption nonce based on the PN for each MPDU. At block 1240, the first L-MAC 414 may add a cyclic redundancy check (CRC) to the encrypted MPDUs. At block 1242, the first L-MAC 414 may generate one or more PPDUs to carry the encrypted MPDUs and transmit the PPDUs via the first wireless communication link 108a. For example, each PPDU may include one encrypted MPDU or a plurality of encrypted MPDUs (such as in an A-MPDU).

In this example, retransmissions of fragments may be performed by the same L-MAC that send an original transmission of the fragment. The retransmission may use the same PN that was used for the original transmission.

Figure 13:
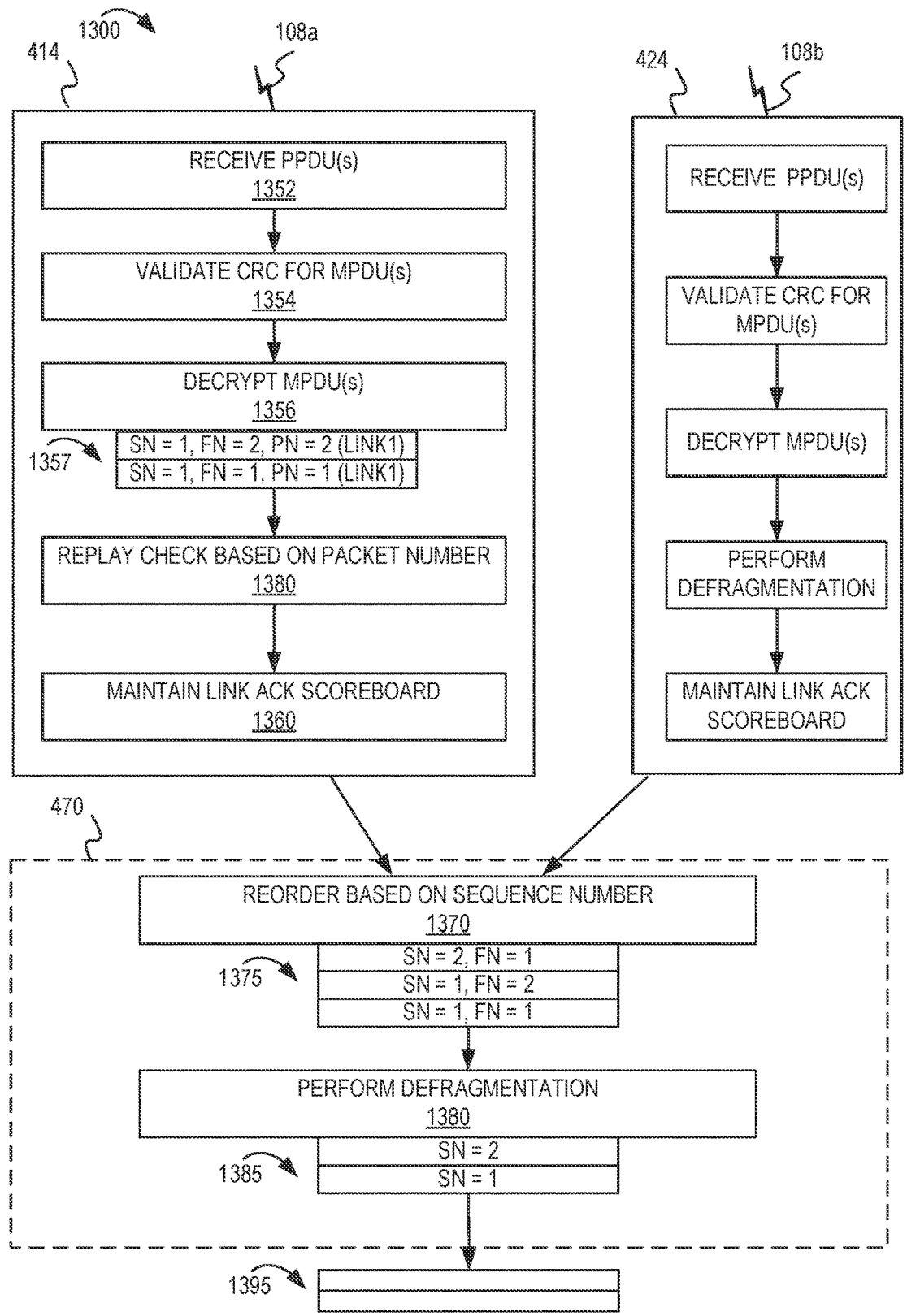
FIG. 13 shows a block diagram of another example receive process for a multi-link operation according to some implementations.

FIG. 13 shows a block diagram of another example receive process 1300 for a multi-link operation according to some implementations. A first L-MAC 414 and a second L-MAC 424 may receive PPDUs (with encrypted, fragmented MPDUs) via a first wireless communication link 108b and a second wireless communication link 108b, respectively. For brevity, the receive process 1300 will be described with reference to the first L-MAC 414. However, similar operations may be performed by the second L-MAC 424. At block 1352, the first L-MAC 414 may receive one or more PPDUs via the first wireless communication link 108a. At block 1354, the first L-MAC 414 may validate the CRC for each encrypted MPDU in the PPDUs. At block 1356, the first L-MAC 414 may decrypt the encrypted MPDUs to obtain two unencrypted MPDUs (which have packet numbers PN=1 and PN=2 that are specific to the first communication link 108a). The unencrypted MPDUs also may have fragment numbers associated with them (FN=1 and FN=2) and sequence numbers (SN=1 for both).

At block 1380, the first L-MAC 414 may perform a replay check based on the packet numbers after the MPDUs 1385 have been reordered based on the PNs. The PNs should be increasing with no repeated PNs in order to determine that no replay attack has been detected. If there is a repeated PN or a decreasing PN, the first L-MAC 414 may determine that a replay attack has been detected and that security of the multi-link operation is compromised. If no replay attack is detected, the first L-MAC 414 may send the unencrypted MPDUs 1395 to the U-MAC layer 470. At block 1360, the first L-MAC 414 may maintain a link acknowledgement scoreboard. The link acknowledgement scoreboard may be used to provide an acknowledgement message back to a transmitter regarding which link-specific PNs have been received or which link-specific PNs have not been received.

At block 1370, the U-MAC layer 470 may reorder the MPDUs 1375 (received from either the first L-MAC 414 or the second L-MAC 424) based on their sequence numbers. At block 1380, the U-MAC layer 470 may perform defragmentation to reconstruct the original full-size MPDUs 1385 (having SN=1 and SN=2). The U-MAC layer 470 may send MSDUs 1395 from the full-size MPDUs 1385 to a higher layer (not shown).

Figure 14:
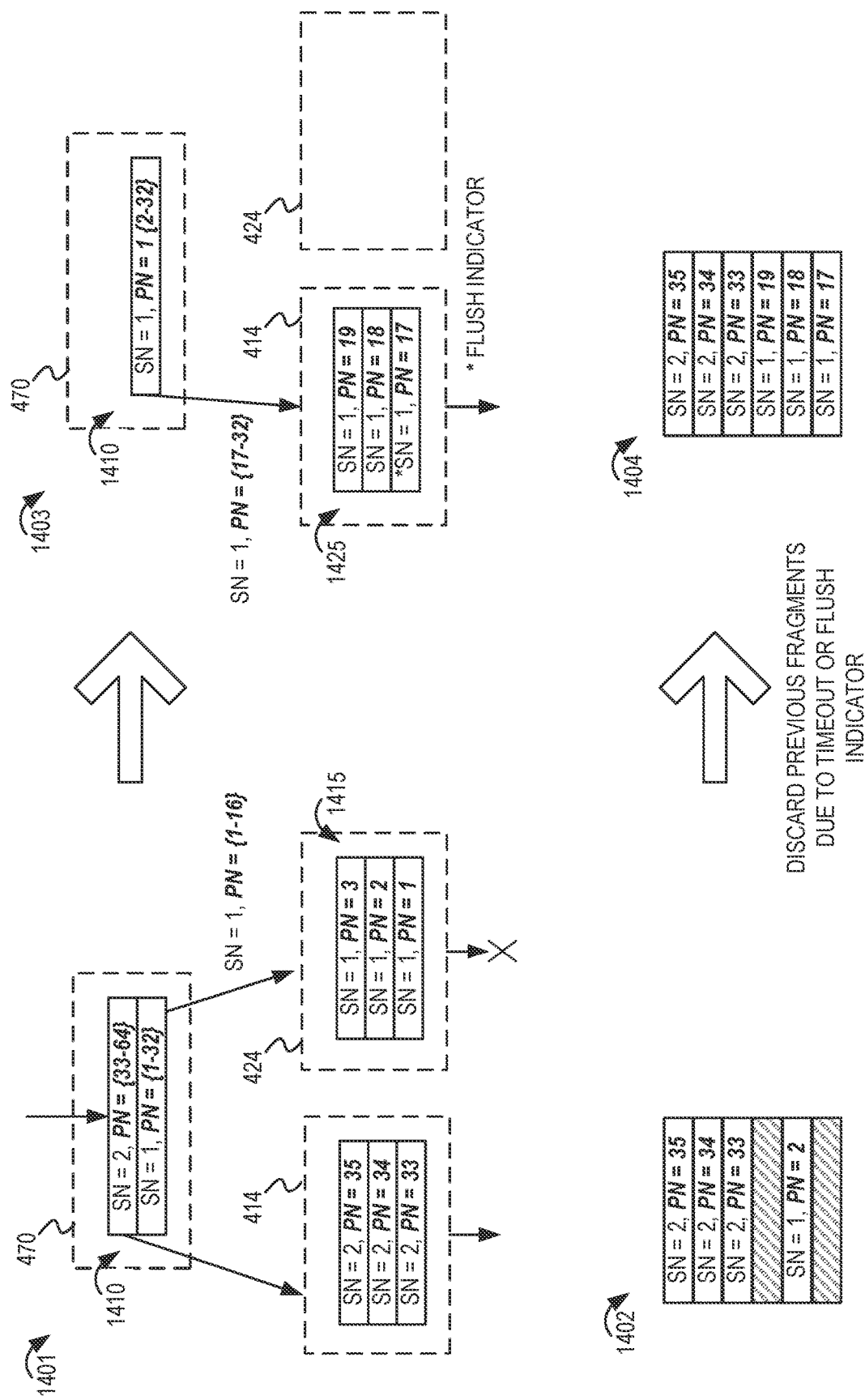
FIG. 14 shows an example of a retransmission using packet number pools in a multi-link operation according to some implementations.

FIG. 14 shows an example of a retransmission using packet number pools in a multi-link operation according to some implementations. In a multi-link operation 1401, a U-MAC layer 470 may have two packets 1410 (sequence number 1 and sequence number 2) to transmit via the first L-MAC 414 and the second L-MAC 424. The U-MAC layer 470 assigns a first pool of PNs (range from 1 to 32) for the first packet (SN=1). The U-MAC layer 470 may send the first packet to the second L-MAC 424 with a subset of the first pool of PNs. For example, the second L-MAC 424 may use a first subset (range from 1 to 16) of the first pool of PNs for the same sequence number 1. The range may be used for fragmentation, L-MAC layer retransmission, or both. In the example shown in FIG. 14, the second L-MAC 424 creates three fragments 1415 and gives the fragments the PN 1, 2, and 3, respectively. Concurrently, the U-MAC layer 470 may provide a second packet (PN=2) to the first L-MAC 414. The second packet uses a second pool of PNs (ranging from 33-64), part of which may be used by the first L-MAC 414 to transmit fragments (which the first L-MAC 414 has assigned PNs 33, 34, and 35 in the example of FIG. 14).

The transmission of the first packet (PN=1) was unsuccessful. As shown at 1402, the receiver may have received a fragment (PN=2) but failed to receive the other fragments (PN=1 and PN=3). Meanwhile, all fragments (PN 33, 34, and 35) of the second packet were successfully received. Based on an acknowledgement (not shown), the U-MAC layer 470 may determine to retransmit the first packet (PN=1). However, for the retransmission (shown at 1403), the U-MAC layer 470 sends the first packet to the first L-MAC 414 (rather than the second L-MAC 424). For the retransmission, the first L-MAC 414 may use a second subset (rang from 17 to 32) of the first pool of PNs. In the example of FIG. 14, the first L-MAC 414 fragments the first packet into three fragments 1425 which are assigned PNs 17, 18, and 19, respectively.

After retransmission of the fragments 1425 the first packet, the receiver may have all fragments (shown at 1404) for the first packet and the second packet. Furthermore, the PNs are monotonically increasing. Thus, the receiver can determine potential replay attack or out of order PNs.

FIG. 14 also shows another concept which may be used for retransmissions in multi-link operation. Because a packet may be retransmitted via a different L-MAC than was used for an initial transmission, the receiver may store fragments from the initial transmission. To prevent the old fragments from being used with the retransmission, an L-MAC may include a flush indicator with one or more of the retransmissions. For example, as shown in FIG. 14, the first fragment (PN=17) of the retransmitted first packet (SN=1) may include a flush indicator to cause the receiver to discard previous fragments for that SN. The flush indicator may be one or more bits in a MAC header, MPDU delimiter, or other preamble associated with the retransmission. Alternatively, or additionally, the receiver may discard old fragments after a timeout period. In some other implementations, the U-MAC layer 470 may delay retransmission so that old fragments are flushed before the retransmission is sent via a different L-MAC. As described herein, the U-MAC may use a variety of techniques for skipping PNs or for assigning a pool of PNs when allocating packets to different L-MACs. The quantity of PNs in a pool of PNs for each packet may depend on fragmentation capabilities, channel conditions, or maximum retransmission attempts, among other examples. Formula (1) shows an example formula for determining a quantity of PNs to include in a pool of PNs for each packet.

$$\text{PN Pool size} = \{\text{max frag count}\} \times \{\text{\# of links}\} \times \{\text{max link alloc count}\} \quad (1)$$

where the max frag count represents a maximum quantity of fragments which can be created by each L-MAC (such as 16 fragments), the # of links represents the quantity of communication links managed by different L-MACs, the max link alloc count represents the number of times a packet may be allocated to the same L-MAC for retransmission.

Figure 15:
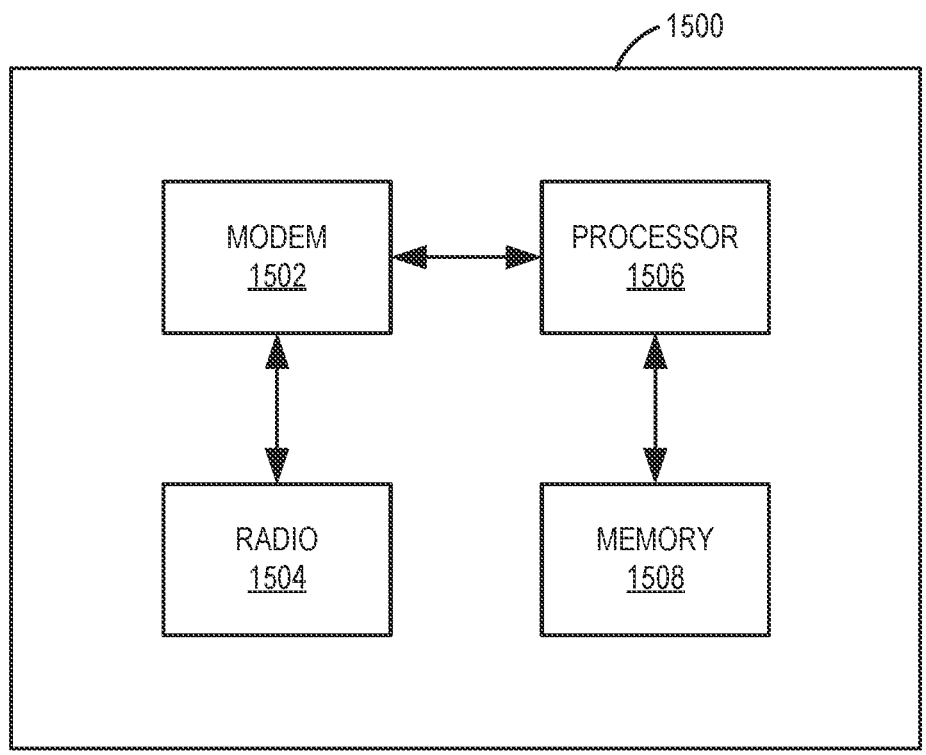
FIG. 15 shows a block diagram of an example wireless communication device.

FIG. 15 shows a block diagram of an example wireless communication device 1500. In some implementations, the wireless communication device 1500 can be an example of a device for use in a STA such as one of the STAs 104 described above with reference to FIG. 1. In some implementations, the wireless communication device 1500 can be an example of a device for use in an AP such as the AP 102 described above with reference to FIG. 1. The wireless communication device 1500 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ah, 802.11ad, 802.11 ay, 802.11ax, 802.11az, 802.11ba and 802.11be.

The wireless communication device 1500 can be, or can include, a chip, system on chip (SoC), chipset, package or device that includes one or more modems 1502, for example, a Wi-Fi (IEEE 802.11 compliant) modem. In some implementations, the one or more modems 1502 (collectively "the modem 1502") additionally include a WWAN modem (for example, a 3GPP 4G LTE or 5G compliant modem). In some implementations, the wireless communication device 1500 also includes one or more radios 1504 (collectively "the radio 1504"). In some implementations, the wireless communication device 1500 further includes one or more processors, processing blocks or processing elements 1506 (collectively "the processor 1506") and one or more memory blocks or elements 1508 (collectively "the memory 1508").

The modem 1502 can include an intelligent hardware block or device such as, for example, an application-specific integrated circuit (ASIC) among other possibilities. The modem 1502 is generally configured to implement a PHY layer. For example, the modem 1502 is configured to modulate packets and to output the modulated packets to the radio 1504 for transmission over the wireless medium. The modem 1502 is similarly configured to obtain modulated packets received by the radio 1504 and to demodulate the packets to provide demodulated packets. In addition to a modulator and a demodulator, the modem 1502 may further include digital signal processing (DSP) circuitry, automatic gain control (AGC), a coder, a decoder, a multiplexer and a demultiplexer. For example, while in a transmission mode, data obtained from the processor 1506 is provided to a coder, which encodes the data to provide encoded bits. The encoded bits are then mapped to points in a modulation constellation (using a selected MCS) to provide modulated symbols. The modulated symbols may then be mapped to a number NSS of spatial streams or a number NSTS of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 1504. In implementations involving beamforming, the modulated symbols in the respective spatial streams are precoded via a steering matrix prior to their provision to the IFFT block.

While in a reception mode, digital signals received from the radio 1504 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 1506) for processing, evaluation, or interpretation.

The radio 1504 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 1500 can include, or be coupled with, multiple transmit antennas (each with a corresponding transmit chain) and multiple receive antennas (each with a corresponding receive chain). The symbols output from the modem 1502 are provided to the radio 1504, which then transmits the symbols via the coupled antennas. Similarly, symbols received via the antennas are obtained by the radio 1504, which then provides the symbols to the modem 1502.

The processor 1506 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 1506 processes information received through the radio 1504 and the modem 1502, and processes information to be output through the modem 1502 and the radio 1504 for transmission through the wireless medium. For example, the processor 1506 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 1506 may generally control the modem 1502 to cause the modem to perform various operations described above.

The memory 1508 can include tangible storage media such as random-access memory (RAM) or read-only memory (ROM), or combinations thereof. The memory 1508 also can store non-transitory processor- or computer-executable software (SW) code containing instructions that, when executed by the processor 1506, cause the processor to perform various operations described herein for wireless communication, including the generation, transmission, reception and interpretation of MPDUs, frames or packets. For example, various functions of components disclosed herein, or various blocks or steps of a method, operation, process, or algorithm disclosed herein, can be implemented as one or more modules of one or more computer programs.

Figure 16B:
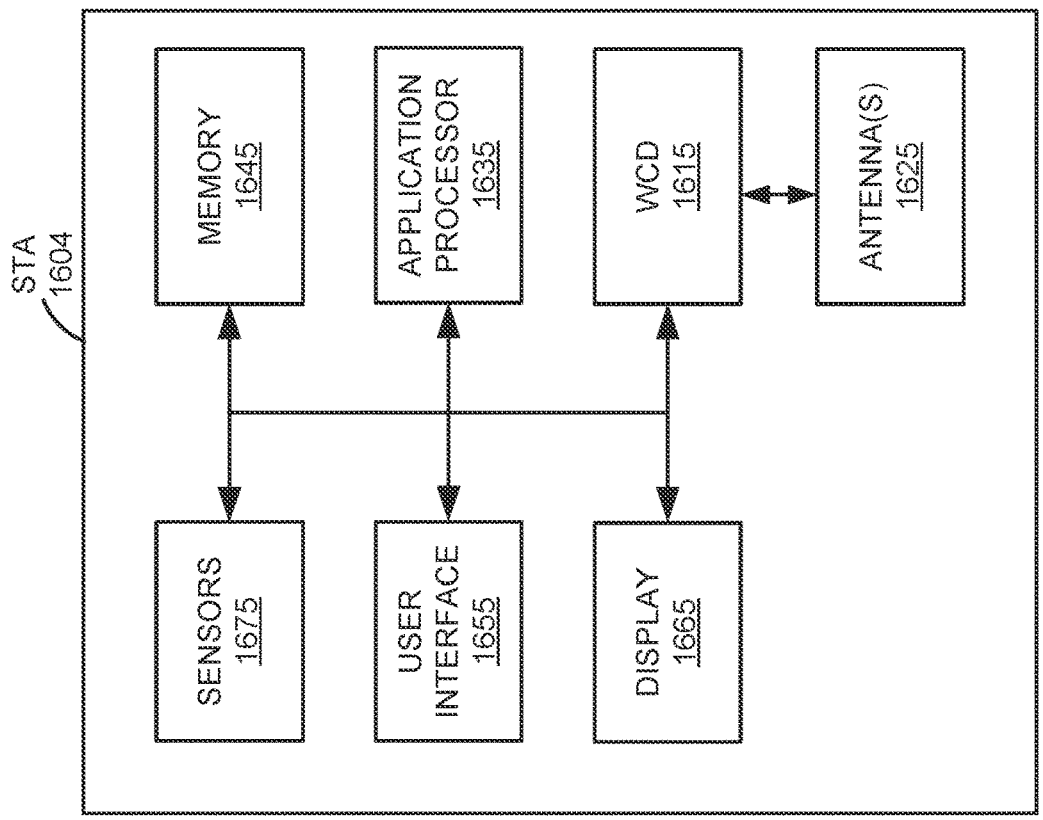
FIG. 16B shows a block diagram of an example STA.
Figure 16A:
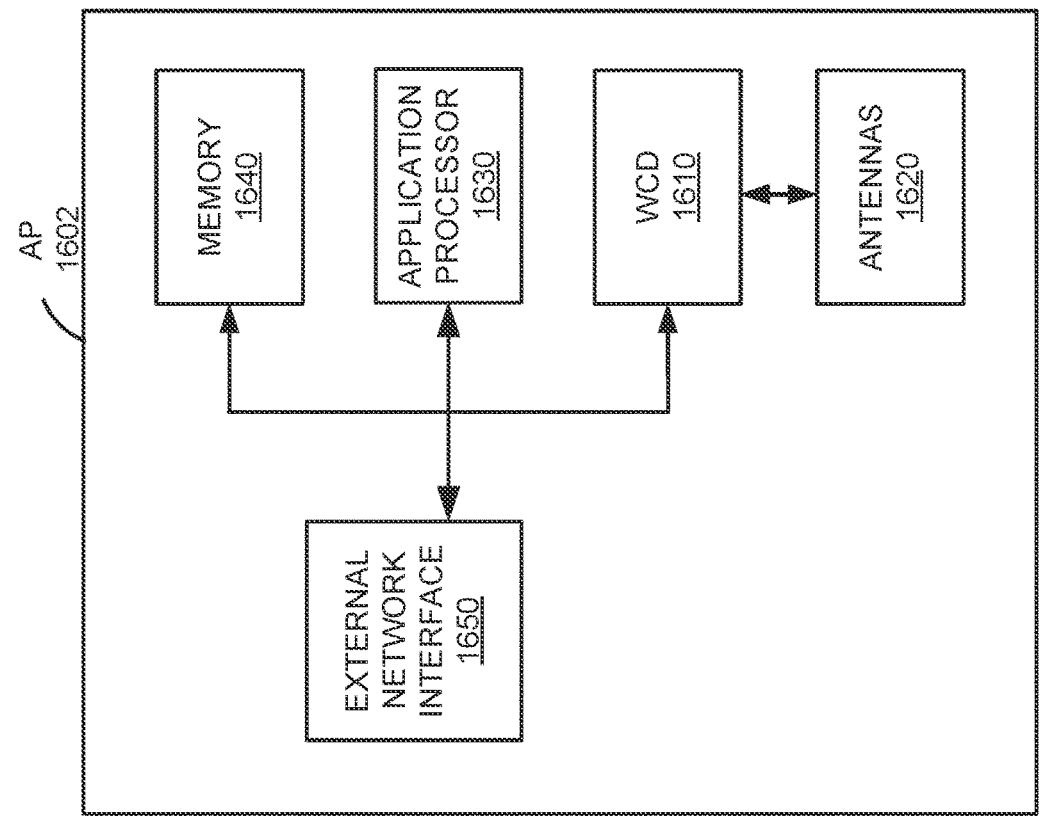
FIG. 16A shows a block diagram of an example AP.

FIG. 16A shows a block diagram of an example AP 1602. For example, the AP 1602 can be an example implementation of the AP 102 described with reference to FIG. 1. The AP 1602 includes a wireless communication device (WCD) 1610. For example, the wireless communication device 1610 may be an example implementation of the wireless communication device 1500 described with reference to FIG. 15. The AP 1602 also includes multiple antennas 1620 coupled with the wireless communication device 1610 to transmit and receive wireless communications. In some implementations, the AP 1602 additionally includes an application processor 1630 coupled with the wireless communication device 1610, and a memory 1640 coupled with the application processor 1630. The AP 1602 further includes at least one external network interface 1650 that enables the AP 1602 to communicate with a core network or backhaul network to gain access to external networks including the Internet. For example, the external network interface 1650 may include one or both of a wired (for example, Ethernet) network interface and a wireless network interface (such as a WWAN interface). Ones of the aforementioned components can communicate with other ones of the components directly or indirectly, over at least one bus. The AP 1602 further includes a housing that encompasses the wireless communication device 1610, the application processor 1630, the memory 1640, and at least portions of the antennas 1620 and external network interface 1650.

FIG. 16B shows a block diagram of an example STA 1604. For example, the STA 1604 can be an example implementation of the STA 104 described with reference to FIG. 1. The STA 1604 includes a wireless communication device 1615. For example, the wireless communication device 1615 may be an example implementation of the wireless communication device 1500 described with reference to FIG. 15. The STA 1604 also includes one or more antennas 1625 coupled with the wireless communication device 1615 to transmit and receive wireless communications. The STA 1604 additionally includes an application processor 1635 coupled with the wireless communication device 1615, and a memory 1645 coupled with the application processor 1635. In some implementations, the STA 1604 further includes a user interface (UI) 1655 (such as a touchscreen or keypad) and a display 1665, which may be integrated with the UI 1655 to form a touchscreen display. In some implementations, the STA 1604 may further include one or more sensors 1675 such as, for example, one or more inertial sensors, accelerometers, temperature sensors, pressure sensors, or altitude sensors. Ones of the aforementioned components can communicate with other ones of the components directly or indirectly, over at least one bus. The STA 1604 further includes a housing that encompasses the wireless communication device 1615, the application processor 1635, the memory 1645, and at least portions of the antennas 1625, UI 1655, and display 1665.

Figure 17:
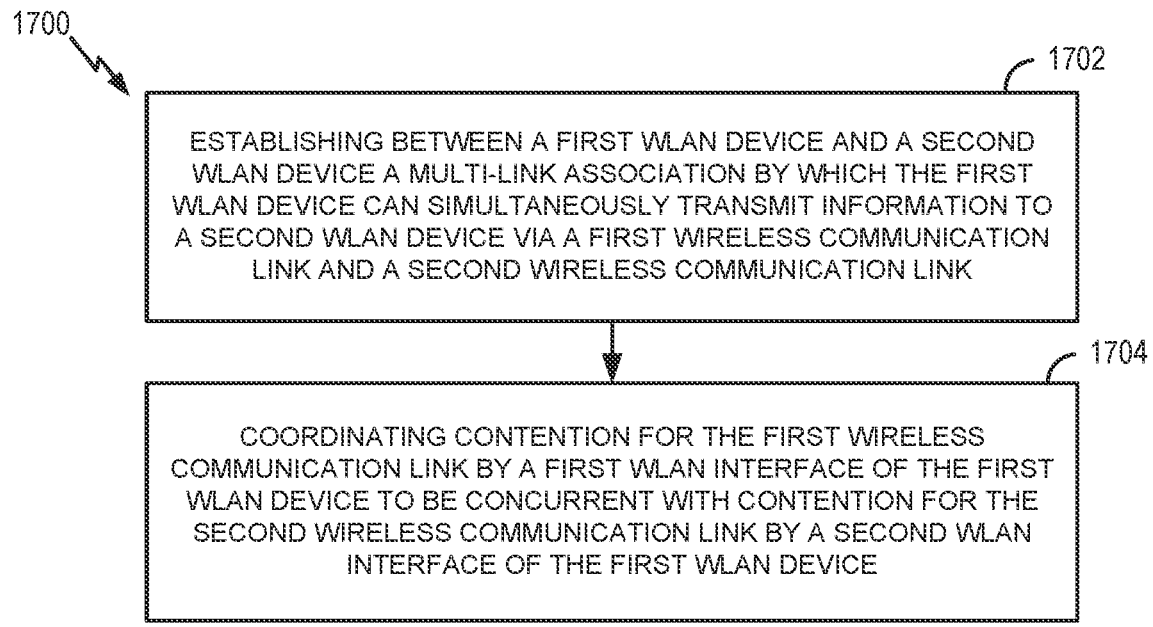
FIG. 17 shows a flowchart illustrating an example process for wireless communication that supports transmission of information using a multi-link operation according to some implementations.

FIG. 17 shows a flowchart illustrating an example process 1700 for wireless communication that supports transmission of information using a multi-link operation according to some implementations. The process 1700 may be performed by a wireless communication device such as the wireless communication device 1500 described above with reference to FIG. 15. In some implementations, the process 1700 may be performed by a wireless communication device operating as or within an AP, such as one of the APs 102 and 1602 described above with reference to FIGS. 1 and 16A, respectively. In some implementations, the process 1700 may be performed by a wireless communication device operating as or within a STA, such as one of the STAs 104 and 1604 described above with reference to FIGS. 1 and 16B, respectively. In the description of process 1700, a first WLAN device (such as the wireless communication device 1500, AP 102, AP 1602, STA 104, or STA 1604) is configured to transmit data using a multi-link operation.

In some implementations, the process 1700 begins in block 1702 with establishing between a first WLAN device and a second WLAN device a multi-link association by which the first WLAN device can simultaneously transmit information to a second WLAN device via a first wireless communication link and a second wireless communication link.

In block 1704, the process 1700 proceeds with coordinating contention for the first wireless communication link by a first WLAN interface of the first WLAN device to be concurrent with contention for the second wireless communication link by a second WLAN interface of the first WLAN device.

In some implementations, after the first and second WLAN interfaces win contention of the first and second wireless communication links, the first WLAN interface may transmit a first PPDU (or other first information) over the first wireless communication link to the second WLAN device. Concurrently with transmission of the first PPDU, the second WLAN interface may transmit a second PPDU (or other second information) over the second wireless communication link to the second WLAN device. The operations described with respect of FIG. 17 and FIG. 4 (and elsewhere herein) may be referred to as a "synch PPDU" process.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication by a first wireless local area network (WLAN) device of a wireless network, the method comprising:
    establishing between the first WLAN device and a second WLAN device a multi-link association by which the first WLAN device can simultaneously transmit information to the second WLAN device via a first wireless communication link and a second wireless communication link; and
    coordinating contention for the first wireless communication link by a first WLAN interface of the first WLAN device to be concurrent with the contention for the second wireless communication link by a second WLAN interface of the first WLAN device, wherein coordinating the contention includes:
transmitting a notification to the second WLAN interface to start a contention procedure for the contention of the second wireless communication link based at least in part on the first WLAN interface starting the contention procedure for the contention of the first wireless communication link, the second WLAN interface starting the contention procedure for the second wireless communication link in response to the first WLAN interface starting the contention procedure for the first wireless communication link such that the first WLAN device simultaneously transmits to the second WLAN device from both the first WLAN interface via the first wireless communication link and the second WLAN interface via the second wireless communication link.

2. The method of claim 1, further comprising:
transmitting dummy information over the first wireless communication link until the second WLAN interface wins the contention for the second wireless communication link.

3. The method of claim 1, wherein the first WLAN interface and the second WLAN interface coordinate the contention by sharing the information over an inter-interface communication link between the first WLAN interface and the second WLAN interface.

4. The method of claim 3, wherein coordinating the contention includes:
transmitting a first signal from the first WLAN interface to the second WLAN interface via the inter-interface communication link to cause the second WLAN interface to contend for access to the second wireless communication link by starting the contention procedure for the contention of the second wireless communication link.

5. The method of claim 3, further comprising:
transmitting, to the second WLAN interface via the inter-interface communication link, a signal for the second WLAN interface to abort the contention procedure for the second wireless communication link.

6. The method of claim 3, further comprising:
providing, over the inter-interface communication link to the second WLAN interface, an indication of a length or transmission duration of first information to be transmitted by the first WLAN interface.

7. The method of claim 6, further comprising:
transmitting the first information to the second WLAN device over the first wireless communication link concurrently with second information to the second WLAN device over the second wireless communication link, wherein transmission of the second information terminates concurrently with the transmission of the first information based, at least in part, on the indication of the length or transmission duration of the first information.

8. The method of claim 1, further comprising:
transmitting first information over the first wireless communication link by the first WLAN interface concurrently with second information over the second wireless communication link by the second WLAN interface; and
transmitting padding information over the first wireless communication link by the first WLAN interface until the second WLAN interface completes transmission of the second information over the second wireless communication link.

9. The method of claim 1, further comprising:
delaying the contention on the first wireless communication link until a back-off counter associated with the second WLAN device reaches a value.

10. The method of claim 1 further comprising:
transmitting, by the first WLAN interface, first information over the first wireless communication link in response to a counter reaching a value.

11. The method of claim 1 further comprising:
delaying transmission of the information over the first wireless communication link by the first WLAN interface in response to a back-off counter reaching a value.

12. A wireless communication apparatus of a first wireless local area network (WLAN) device, comprising:
one or more processors configured to:
establish between the first WLAN device and a second WLAN device a multilink association by which the first WLAN device can simultaneously transmit information to the second WLAN device via a first wireless communication link and a second wireless communication link; and
coordinate contention for the first wireless communication link by a first WLAN interface of the first WLAN device to be concurrent with the contention for the second wireless communication link by a second WLAN interface of the first WLAN device, wherein the one or more processors configured to coordinate the contention includes the one or more processors configured to:
transmit a notification to the second WLAN interface to start a contention procedure for the contention of the second wireless communication link based at least in part on the first WLAN interface starting the contention procedure for the contention of the first wireless communication link, the second WLAN interface starting the contention procedure for the second wireless communication link in response to the first WLAN interface starting the contention procedure for the contention of the first wireless communication link such that the first WLAN device simultaneously transmits to the second WLAN device from both the first WLAN interface via the first wireless communication link and the second WLAN interface via the second wireless communication link, wherein:
the first WLAN interface is configured to transmit at least a first portion of the information over the first wireless communication link to the second WLAN device and
the second WLAN interface is configured to simultaneously transmit at least a second portion of the information over the second wireless communication link to the second WLAN device.

13. The wireless communication apparatus of claim 12, further comprising:
an inter-interface communication link between the first WLAN interface and the second WLAN interface.

14. The wireless communication apparatus of claim 13, the first WLAN interface is further configured to:
transmit a first signal to the second WLAN interface via the inter-interface communication link to cause the second WLAN interface to contend for access to the second wireless communication link by starting the contention procedure for the contention of the second wireless communication link.

15. The wireless communication apparatus of claim 12, further comprising:
a first transceiver coupled to the first WLAN interface;
a second transceiver coupled to the second WLAN interface;
a plurality of antennas couple to the first transceiver and the second transceiver to wirelessly transmit signals output from the first transceiver and the second transceiver; and
a housing that encompasses the one or more processors, the first WLAN interface, the second WLAN interface, the first transceiver, the second transceiver, and at least a portion of the plurality of antennas.

16. A non-transitory machine-readable storage medium including machine-readable program code that, when executed by a processor, causes the processor to perform operations for wireless communication, the machine-readable program code comprising:
program code to establish between a first WLAN device and a second WLAN device a multi-link association by which the first WLAN device can simultaneously transmit information to the second WLAN device via a first wireless communication link and a second wireless communication link; and
program code to coordinate contention for the first wireless communication link by a first WLAN interface of the first WLAN device to be concurrent with the contention for the second wireless communication link by a second WLAN interface of the first WLAN device, wherein the program code to coordinate the contention includes:
program code to transmit a notification to the second WLAN interface to start a contention procedure for the contention of the second wireless communication link based at least in part on the first WLAN interface starting the contention procedure for the contention of the first wireless communication link, the second WLAN interface starting the contention procedure for the second wireless communication link in response to the first WLAN interface starting the contention procedure for the first wireless communication link such that the first WLAN device simultaneously transmits to the second WLAN device from both the first WLAN interface via the first wireless communication link and the second WLAN interface via the second wireless communication link.

17. The non-transitory machine-readable storage medium of claim 16, wherein the machine-readable program code further comprises:
program code to transmit a first signal over an inter-interface communication link between the first WLAN interface and the second WLAN interface to cause the second WLAN interface to contend for access to the second wireless communication link by starting the contention procedure for the contention of the second wireless communication link.

18. The non-transitory machine-readable storage medium of claim 16, wherein the machine-readable program code further comprises:
program code to delay the contention on the first wireless communication link until a back-off counter associated with the second WLAN device reaches a value.

19. The non-transitory machine-readable storage medium of claim 16, wherein the machine-readable program code further comprises:
program code to delay transmission of the information over the first wireless communication link by the first WLAN interface in response to a back-off counter reaching a value.

* * * * *